United States Patent
Lee et al.

(10) Patent No.: US 10,462,702 B2
(45) Date of Patent: Oct. 29, 2019

(54) APPARATUS AND METHOD FOR CONTROLLING TRANSMISSION ON HIGH THOUGHPUT WIRELESS NETWORK

(71) Applicant: Samsung Electronics Co., Ltd., Gyeonggi-do (KR)

(72) Inventors: Hyun-Joo Lee, Seoul (KR); Jin-Hyoung Kim, Seongnam-si (KR); Jiangwei Xu, Suwon-si (KR); Jin-Ho Lee, Seoul (KR); Krishna Manohar Singh, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 15/410,866

(22) Filed: Jan. 20, 2017

(65) Prior Publication Data
US 2017/0208498 A1    Jul. 20, 2017

(30) Foreign Application Priority Data

Jan. 20, 2016 (KR) ........................ 10-2016-0006819

(51) Int. Cl.
| | | |
|---|---|---|
| *H04L 1/00* | (2006.01) | |
| *H04W 28/02* | (2009.01) | |
| *H04W 76/19* | (2018.01) | |
| *H04W 24/04* | (2009.01) | |
| *H04W 76/18* | (2018.01) | |
| *H04W 24/08* | (2009.01) | |

(Continued)

(52) U.S. Cl.
CPC ....... *H04W 28/0289* (2013.01); *H04W 24/04* (2013.01); *H04W 76/19* (2018.02); *H04W 24/08* (2013.01); *H04W 36/14* (2013.01); *H04W 76/18* (2018.02); *H04W 80/06* (2013.01)

(58) Field of Classification Search
None
See application file for complete search history.

(56) References Cited

U.S. PATENT DOCUMENTS

| 8,583,053 B1 | 11/2013 | Mahbod et al. |
|---|---|---|
| 2004/0264366 A1 | 12/2004 | Swami |

(Continued)

FOREIGN PATENT DOCUMENTS

| WO | 2012065646 A1 | 5/2012 |
|---|---|---|
| WO | 2014165346 A1 | 10/2014 |

OTHER PUBLICATIONS

P. Sarolahti, et al., "Forward RTO-Recovery (F-RTO): An Algorithm for Detecting Spurious Retransmission Timeouts with TCP," RFC 5682, Sep. 2009, 19 pages.

(Continued)

*Primary Examiner* — Kwang B Yao
*Assistant Examiner* — Juvena W Loo

(57) ABSTRACT

Apparatuses and methods for performing congestion control in a transmission control protocol (TCP) environment in a wireless communication system are provided. At least one recovery session is opened a preset time after a time-out occurs in an original session, and whether link recovery is achieved after the at least one recovery session is opened and before a preset maximum wait time elapses is monitored. If the link recovery is achieved, a transmission speed is recovered according to a scenario corresponding to a time when the link recovery is achieved.

18 Claims, 22 Drawing Sheets

(51) Int. Cl.
*H04W 36/14* (2009.01)
*H04W 80/06* (2009.01)

(56) References Cited

U.S. PATENT DOCUMENTS

| | | | |
|---|---|---|---|
| 2005/0030895 A1* | 2/2005 | Zeira | H04L 1/0002 370/231 |
| 2005/0174935 A1* | 8/2005 | Segel | H04L 45/22 370/228 |
| 2010/0202358 A1 | 8/2010 | Wu et al. | |
| 2012/0269062 A1 | 10/2012 | Cho | |
| 2013/0155847 A1 | 6/2013 | Li et al. | |
| 2014/0050095 A1* | 2/2014 | Szilagyi | H04L 1/0002 370/236 |
| 2014/0086048 A1* | 3/2014 | Jang | H04L 1/1809 370/229 |
| 2014/0286313 A1* | 9/2014 | Fu | H04W 36/08 370/331 |
| 2014/0321267 A1 | 10/2014 | Jiang et al. | |
| 2018/0132300 A1* | 5/2018 | Viering | H04W 76/15 |

OTHER PUBLICATIONS

Song Cen, et al., "End-to-End differentiation of congestion and wireless losses," Submission to ACM/IEEE Trans. on Networking, Oct. 2003, pp. 1-14.

ISA/KR, "International Search Report," Application No. PCT/KR2017/000707, dated Apr. 25, 2017, 3 pages, Korean Intellectual Property Office, Daejeon, Korea.

ISA/KR, "Written Opinion of the International Search Authority," Application No. PCT/KR2017/000707, dated Apr. 25, 2017, 6 pages, Korean Intellectual Property Office, Daejeon, Korea.

European Patent Office, "Supplementary European Search Report," Application No. EP 17741693.0, dated Nov. 13, 2018, 7 pages.

\* cited by examiner

APPARATUS AND METHOD FOR CONTROLLING TRANSMISSION ON HIGH THOUGHPUT WIRELESS NETWORK

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Jan. 20, 2016 and assigned Serial No. 10-2016-0006819, the entire disclosure of which is incorporated herein by reference.

TECHNICAL FIELD

Various embodiments of the present disclosure are directed to apparatuses and methods for performing transmission control based on the transmission control protocol (TCP) on high-speed wireless networks.

BACKGROUND

In order to meet the demand for wireless data traffic soaring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Various schemes are being put forward in preparation for providing stable communication services considering communication environments in wireless communication systems. For example, a wireless communication system may carry out congestion control in order to achieve high performance and avoid collapse due to congestion.

As an example, the transmission control protocol (TCP) adopts two mechanisms, i.e., flow control and congestion control, to ensure end-to-end reliability.

Flow control is to control the amount of packets that the transmit device is to send considering the status of the receive buffer of the receive device, and congestion control is to adjust the amount of packets that the transmit device is to send considering network congestion (e.g., the status of the buffer of a relay device).

The transmit device may perform flow control by receiving an advertised window (RWND) size from the receive device and then transmitting packets in a smaller size than that. The transmit device may fulfill congestion control by monitoring the condition of the network and adjusting the congestion window (CWND) size based on a result monitored. The CWND size adjusted may determine the size of one packet of transmission.

The transmit device supportive of flow control and congestion control may determine the size of one packet of transmission using the smaller of the RWND size and the CWND size.

For congestion control purposes, the transmit device may predict the condition of the network based on information provided from the receive device or by directly monitoring the condition of the network.

For example, the transmit device may predict the condition of the network based on the reception of a notification indicating the failure to receive a particular packet from the receive device or failure to receive a response signal (e.g., an ACK) from the receive device within a predetermined time period. Upon failure to receive a response signal (e.g., an ACK) from the receive device within a predetermined time period, the transmit device may be subject to a time-out. The transmit device may notice the failure of the receive device to receive a particular packet by receiving a duplicate ack (DUP-ACK) from the receive device. That is, the transmit device may recognize the occurrence of a packet loss.

Typically, when a time-out occurs, the transmit device adjusts the CWND size based on TCP congestion control, taking it long to recover the transmit bandwidth. This is why, as per the TCP congestion control, the CWND size sharply reduces when an error occurs, but on recovery, the increase in the CWND size is relatively slow. Further, as the period of retransmission attempted after the time-out occurs exponentially increases, a delay may intervene between when the error recovers and when the transmission resumes.

This leads to the need for preparing for schemes for enabling the transmission to resume earlier upon error recovery after a time-out and shortening the time for recovering a desired transmission speed after the transmission resumes.

The above information is presented as background information only to assist with an understanding of the present disclosure. No determination has been made, and no assertion is made, as to whether any of the above might be applicable as prior art with regard to the present disclosure.

SUMMARY

To address the above discussed deficiencies, it is a primary object to provide a method and apparatus for differentially recovering transmission speed per section encountered with an error in a wireless communication system.

According to an embodiment of the present disclosure, there may be provided a method for shortening the time required to recover TCP transmission speed according to errors caused in wireless network sections in a wireless communication system.

According to an embodiment of the present disclosure, there may be provided an adaptive session recovery scheme attempting to recover a TCP session in a differentiated manner, considering the type and time of errors occurring in a wireless communication system.

According to an embodiment of the present disclosure, a method for adaptive session recovery by a wireless device supporting a transmission communication protocol in a high-speed wireless network may comprise opening at least one recovery session a preset time after a time-out occurs in an original session, monitoring whether link recovery is achieved after the at least one recovery session is opened and before a preset maximum wait time elapses, and if the link recovery is achieved, recovering a transmission speed according to a scenario corresponding to a time when the link recovery is achieved.

According to an embodiment of the present disclosure, a wireless device supporting a transmission communication protocol in a high-speed wireless network may comprise a communication module and a control module opening at least one recovery session a preset time after a time-out occurs in an original session, monitoring whether link recovery is achieved after the at least one recovery session is opened and before a preset maximum wait time elapses, and if the link recovery is achieved, recovering a transmission speed according to a scenario corresponding to a time when the link recovery is achieved.

According to embodiments of the present disclosure, the interval where an error occurs may be identified, and congestion control suited for the section encountered with an error identified may be performed, enabling the quick recovery of transmission speed according to the section encountered with an error. In particular, the TCP transmission speed reduced due to an error caused in the wireless link may rapidly be recovered.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
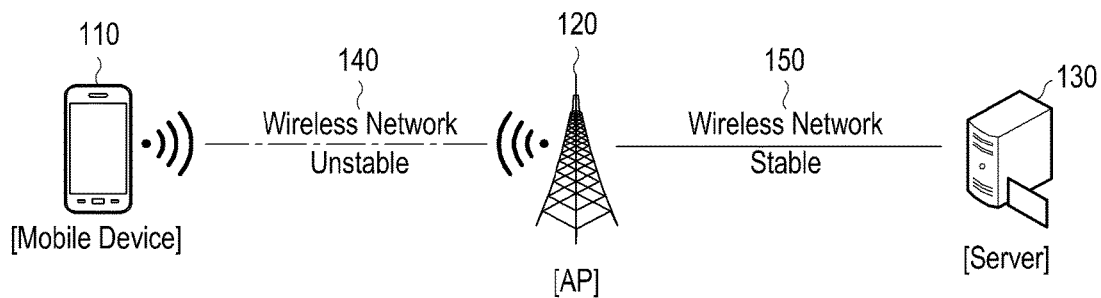
FIG. 1 illustrates one link formed in a TCP-based network according to an embodiment of the present disclosure.

FIGS. 1 through 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

According to various embodiments of the present disclosure, there are provided schemes for quick transmission speed recovery through error recovery when a transmit device supportive of the transmission control protocol (TCP) is encountered with a time-out due to an error in the wireless network section.

According to an embodiment of the present disclosure, when a time-out occurs, the transmit device may determine whether the error has occurred in the wired network section or wireless network section and quickly recover the transmission speed using one of TCP transmission control mechanisms previously defined for section encountered with an errors based on the result of the determination.

To that end, a need exists for a scheme for the transmit device to monitor wireless quality and determine whether the error has occurred on the wired network section or wireless network section based on the result monitored.

According to an embodiment of the present disclosure, the transmit device may be allowed quick recovery of transmission speed after the session recovers, considering the number of times at which duplicate acknowledges (DUP-ACKs) have been received before the occurrence of the time-out. For example, where the session is recovered after a single DUP-ACK is received, the transmission speed may be recovered using the original session recovered, and where the session is recovered after multiple DUP-ACKs are received, the transmission speed may be recovered using the original session recovered and a recovery session opened.

For quick recovery to a desired transmission speed, the transmit device may open as many new sessions as necessary. In other words, the transmit device may open new sessions one-by-one while measuring the bandwidth of the network, with the original session maintained. The transmit device may open new sessions until the bandwidth does not increase any longer. When securing a maximum transmission speed by opening new sessions, the transmit device may stop opening a new session.

A scheme for recovering transmission speed through multiple sessions, as proposed according to an embodiment of the present disclosure, may preferably be applied to communication environments with a large round trip time (RTT).

According to an embodiment of the present disclosure, the transmit device may prepare for a scheme for quick transmission speed recovery per time that the link is recovered after the time-out occurs. For example, the transmit device may open a recovery session a predetermined time (e.g., a recovery time objective (RTO)-2RTT) after the time-out occurs and then prepare for a scheme for recovering the transmission speed distinctively as to whether the link recovery has occurred before or after a time (T1, e.g. the RIO) set for initial retransmission. Further, the transmit device prepares for a scheme for recovering the transmission speed distinctively as to whether the link recovery occurs before or after the maximum wait time (T2, Max RTO) after the initial retransmission has occurred.

According to an embodiment of the present disclosure, the transmission speed recovery using multiple sessions may apply only to the cases where the link recovery occurs before the maximum wait time and after the initial retransmission has occurred. The transmit device may hand over to another network unless the link is recovered until the maximum wait time elapses. The transmit device, upon link recover before the initial retransmission is made, may perform fast recovery through the original session.

Hereinafter, various embodiments of the present disclosure are described in detail with reference to the accompanying drawings.

FIG. 1 is a view illustrating one link formed in a TCP-based network according to an embodiment of the present disclosure.

Referring to FIG. 1, one link connecting a wireless device 110 and a server 130 can include a wireless network section 140 and a wired network section 150.

The wireless device 110 can be an electronic device supporting wireless communication services on a high-speed network (e.g., mmWave) based on the transmission control protocol (TCP). Examples of the electronic device can include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

The electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame.

Examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning satellite (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or internet of things (IoT) devices (e.g., a bulb, various sensors, an electric or gas meter, a sprinkler, a fire alarm, a thermostat, a street light, a toaster, fitness equipment, a hot water tank, a heater, or a boiler).

Examples of the electronic device can at least one of part of a piece of furniture or building/structure, an electronic board, an electronic signature receiving device, a projector, or various measurement devices (e.g., devices for measuring water, electricity, gas, or electromagnetic waves).

The electronic device can be a combination of one or more of the above-enumerated devices or a flexible electronic device.

According to an embodiment of the present disclosure, the wireless network section 140 can be at least one session connecting the wireless device 110 with a relay device (e.g., an access point (AP)) 120 using a radio resource, and the wired network section 150 can be at least one session connecting the relay device 120 with the server 130 using a wired resource.

The wireless network section 140 can be relatively unstable as compared with the wired network section 150. For example, the wired network section 150 can be significantly less likely to encounter errors as compared with the wireless network section 140. For example, since the wireless network section 140 can run into severe variations in communication environment, a need exists for preparing for a scheme for stably supporting stable communication services. A representative example can be TCP-based congestion control that controls transmission speed (transmission rate) based on variations in communication environment in the wireless network section 140.

In the above architecture, where the wireless network section 140 supports a high-speed wireless network environment, such a circumstance can arise that the maximum transmission bandwidth cannot be used due to TCP operation when an error occurs in the wireless network section 140. This is why an error occurring on the wireless network section 140 can cause a sharp decrease in the CWND due to the TCP congestion control algorithm the recovery of which takes long.

Thus, when an error occurs in the TCP-based high-speed wireless network environment, an error recovery scheme needs to be prepared per section where an error occurs. In other words, an error occurring in the wired network section 150 can be recovered using a first error recovery algorithm, and an error occurring in the wireless network section 140 can be recovered using a second recovery algorithm.

A transmission control mechanism applied to a typical TCP-based network can be used as the first error recovery algorithm, and a transmission control mechanism proposed for fast recovery of transmission speed upon error recovery can be used as the second error recovery algorithm. The transmission control mechanism proposed as the second error recovery algorithm can be one scheme included in the 'adaptive session recovery algorithm.' For example, the adaptive session recovery algorithm can include, e.g., a 'TCP congestion control algorithm,' a 'TCP retransmission algorithm,' a 'TCP transmission control mechanism,' and a 'TCP recovery method.'

Figure 2:
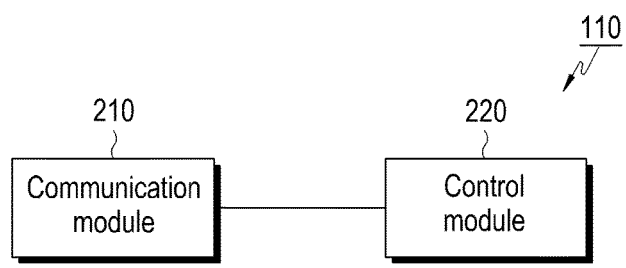
FIG. 2 is a block diagram illustrating a wireless device according to an embodiment of the present disclosure.

FIG. 2 is a block diagram illustrating a wireless device according to an embodiment of the present disclosure.

Referring to FIG. 2, a communication module 210 can establish communication with an external device (e.g., a base station, an AP, or an external electronic device) based on at least one communication protocol. For example, the communication module 210 can be connected to a wireless network based on a predetermined communication protocol to communicate with the external device (e.g., a base station, an AP, or an external electronic device).

The communication protocol can include, e.g., the transmission control protocol (TCP) or a cellular communication protocol. The cellular communication protocol can use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol.

A control module 220 can control the communication module 210 to enable communication with the external device connected via at least one session based on at least one communication protocol.

According to an embodiment of the present disclosure, the control module 220 can determine whether an error attributable to a time-out occurs on the wireless network section or wired network section based on wireless quality and prepare for a scheme for recovering the transmission speed after link recovery, considering the result of the determination.

According to an embodiment of the present disclosure, the control module 220 can differently use the session for recovery of transmission speed considering the number of times of reception of duplicate acknowledges (DUP-ACKs). For example, upon reception of a single DUP-ACK, the control module 220 can use the recovered original session for transmission speed recovery. Upon receiving multiple DUP-ACKs, the control module 220 can recover the transmission speed using at least one session newly opened, as well as the recovered original session. In such case, rapid recovery of transmission speed can be rendered possible.

According to an embodiment of the present disclosure, the control module 220 can open multiple new sessions until a target transmission speed can be recovered. This can contribute to quick recovery of the transmission speed of the transmit device in a large-RTT communication environment.

According to an embodiment of the present disclosure, the control module 220 can open a new session a predetermined time after the time-out occurs and can monitor whether the link is recovered after the new session has been opened. When the link is recovered, the control module 220 can recover the transmission speed using the recovery scheme corresponding to the time when the link was recovered among recovery schemes respectively set for recovery times.

Figure 3:
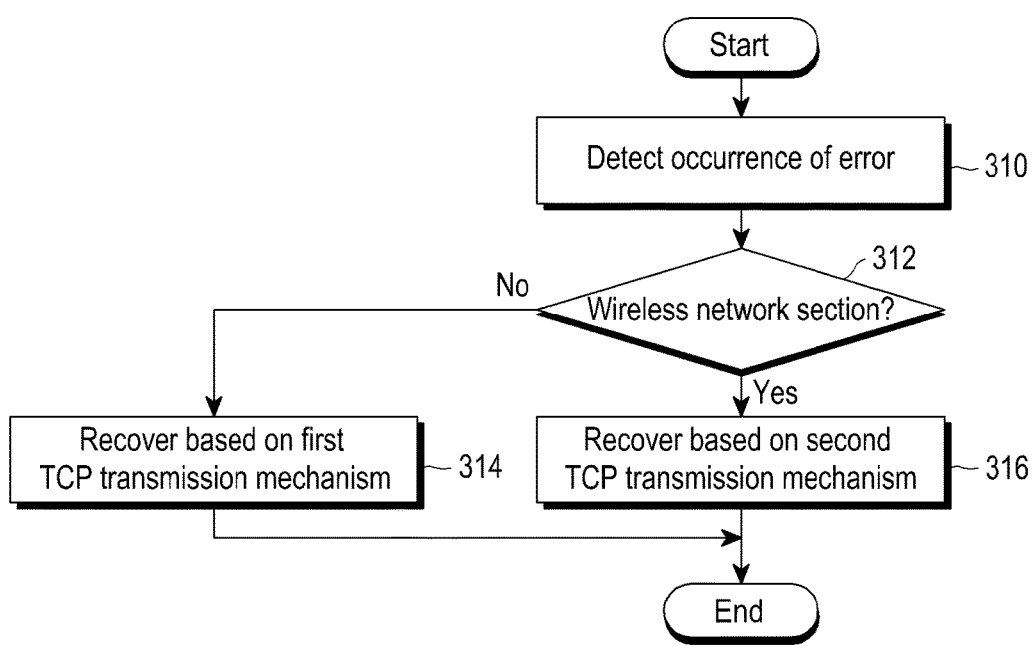
FIG. 3 illustrates a control flow for recovering a transmission speed considering an section encountered with an error in a wireless device according to an embodiment of the present disclosure.

FIG. 3 is a view illustrating a control flow for recovering a transmission speed considering a section encountered with an error in a wireless device according to an embodiment of the present disclosure.

Referring to FIG. 3, the wireless device can detect the occurrence of an error in operation 310. For example, when a time-out occurs as packet transmission is continuously impossible for a predetermined time, the wireless device can detect the same as an error occurrence.

Congestion control under the TCP can come normally in three states. In other words, the three states consist of a slow start step, a congestion avoidance step, and a congestion detection step.

The slow start step is the step that communication starts based on the TCP in which case the CWND size can exponentially increase in preparation to normal packet transmission. For example, the transmit device can set the initial CWND size to 1 and can double the CWND size whenever receiving a response signal (e.g., an ACK) from the receive device. In other words, the CWND size can increase up to 1, 2, 4, 8, 16 . . . . Tmax. Here, Tmax is the maximum amount of data that can be transmitted at the slow start step, e.g., slow start threshold (ssthresh), which can be contextually varied. When the CWND size reaches Tmax, the transmit device can end the slow start step and go over to the next step, i.e., the congestion avoidance step. The transmit device, when congestion occurs in the slow start step, can set Tmax to a half the current CWND size and reset the CWND to the initial value.

To summarize the above-described TCP-based congestion control procedure, the transmit device can initially set the CWND size to 1 and transmit packets based thereupon. Upon receiving a signal (e.g., an ACK) responsive to a packet transmitted, the transmit device can double the CWND size, i.e., increase the CWND size to 2, and send packets based thereupon. When receiving a response signal (e.g., an ACK) for the second transmission, the transmit device can double the current CWND size, i.e., increase to 4, and transmit packets based thereupon. Where the transmit device continues to succeed in packet transmission, the transmit device might increase the CWND size up to the maximum value Tmax (e.g., 1024).

The transmit device, upon failing to receive a signal (e.g., an ACK) responsive to a packet transmitted, can reduce the CWND size to a predetermined threshold (ssthresh) and then transmission packets based thereupon.

The congestion avoidance step in which communication is in a stable state can increase the CWND size by a predetermined value (1 mss) at each reception of a response signal (e.g., an ACK). This is denoted 'additive increase.' When congestion occurs in the congestion avoidance step, the transmit device can go over to the congestion detection step.

Two conditions come along to go from the congestion avoidance step over to the congestion detection step: i.e., where a time-out occurs; and where DUP-ACKs are received continuously three times.

Upon entry into the congestion detection step due to the occurrence of a time-out, the transmit device can initialize the CWND, reduce Tmax to a half the current CWND size, and then go back to the slow start step.

Where the transmit device receives DUP-ACKs continuously three times and thus goes over to the congestion detection step, the transmit device can reduce the CWND and Tmax each in half and then go over to the congestion avoidance step.

When the occurrence of an error is detected based on what has been described, the transmit device determines, in operation 312, whether the error has occurred on the wireless network section or wired network section. So doing is for the purpose of applying different transmission speed recovery schemes according to the section encountered with an error. For example, the section encountered with an error can be determined through correlation between wireless link quality and TCP quality.

When the error occurs on the wired network section, the wireless device can perform error recovery based on the first TCP transmission mechanism in operation 314. When the error otherwise occurs on the wireless network section, the wireless device can perform error recovery based on the second TCP transmission mechanism in operation 316. The second TCP transmission mechanism enables quick transmission speed recovery by at least one session newly opened and/or the recovered session. This can prevent a transmission delay due to exponential back-off under the TCP and a slowdown due to the reduction in the CWND and enables a backup channel to be secured through TCP-based multiple sessions.

Figure 4:
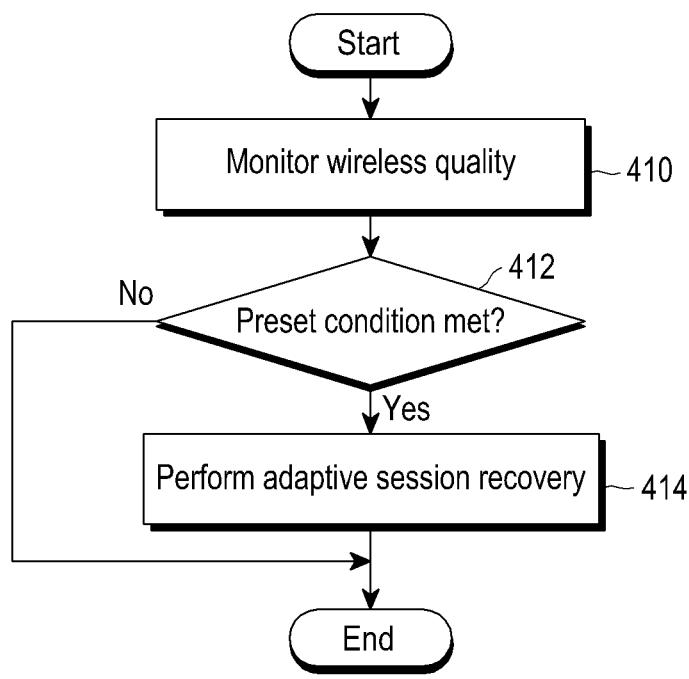
FIG. 4 illustrates a control flow for determining an section encountered with an error in a wireless device according to an embodiment of the present disclosure.

FIG. 4 is a view illustrating a control flow for determining an section encountered with an error in a wireless device according to an embodiment of the present disclosure.

Referring to FIG. 4, the wireless device can monitor the wireless quality for the current session in operation 410. The current session can be formed by at least one link supportive of TCP-based communication. For example, the wireless quality can be defined with, e.g., a wireless link parameter or TCP parameter. As the wireless link parameter, information defining a signal strength, e.g., received signal strength indicator (RSSI), error vector magnitude (EVM), or committed information rate (CIR), or a packet transmission rate (e.g., PER or SPC) can be used. As the TCP parameter, TCP throughput (e.g., RTT or CWND size), retransmission rate, or duplicated ACK number can be used.

The wireless device can determine whether the error occurs on the wired network section or wireless network section according to whether the wireless quality meets a preset condition in operation 412. For example, the section encountered with an error can be determined based on the degree of correlation between the wireless link parameter and the TCP parameter.

According to an embodiment of the present disclosure, where the wireless link parameter and the TCP parameter do not meet preset thresholds, the error can be determined to have occurred on the wireless network section. The threshold for the wireless link parameter and the threshold for the TCP parameter can be set independently of each other. In other words, the threshold for the wireless link parameter can be set to a value for determining that the wireless link is not in a good condition, and the threshold for the TCP parameter can be set to a value for determining that the TCP performance is not in a good condition.

An example of the condition to determine the section encountered with an error can be defined as in Table 1 below:

TABLE 1

| Retransmission rate | PER | Section encountered with an error |
|---|---|---|
| Bad | Good | Wired |
| Bad | Bad | Wireless |
| Good | Bad | N/A |
| Good | Good | N/A |

An example of the condition to determine the link state based on the threshold can be defined as in Equation 1 below:

$$State=Current(parameter)<Threshold\_Constant \quad [Equation\ 1]$$

Here, Threshold_Constant is the constant indicating a disconnection of the wireless link or a low performance of quality.

$$State=Current(parameter)<Threshold\_Constant \quad [Equation\ 2]$$

Here, Threshold_Diff is the value indicating a variation in the performance of the wireless link which is large enough to disable communication.

When the wireless quality of the current session meets a preset condition, the wireless device can determine that the error has occurred on the wired network section, and in operation 414, perform an adaptive session recovery procedure. Here, the adaptive session recovery procedure is defined as recovering a session by a procedure that differs per error recovery requirement. For example, the adaptive session recovery procedure can correspond to the second TCP transmission mechanism set forth above in connection with FIG. 3.

Figure 5:
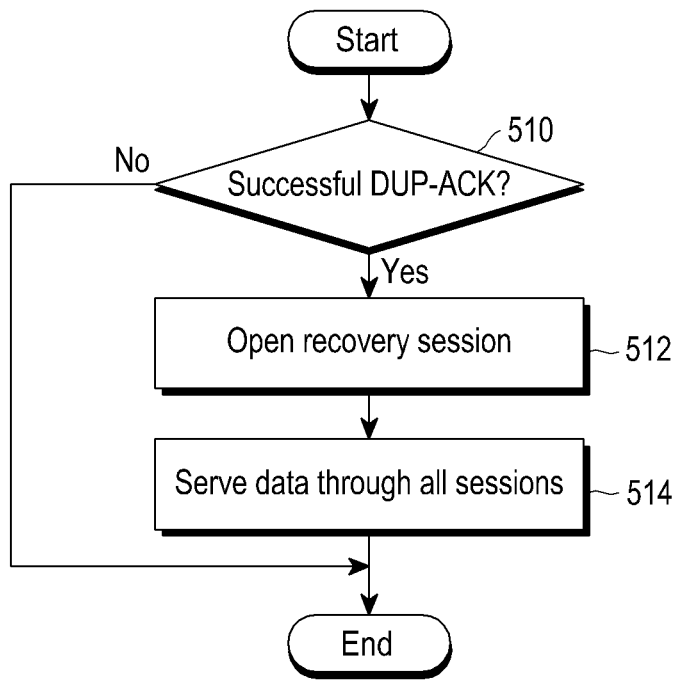
FIG. 5 illustrates a control flow corresponding to an adaptive session recovery procedure for recovering an error caused in a wireless network section in a wireless device according to an embodiment of the present disclosure.

FIG. 5 is a view illustrating a control flow corresponding to an adaptive session recovery procedure for recovering an error caused in a wireless network section in a wireless device according to an embodiment of the present disclosure.

Referring to FIG. 5, the wireless device, in operation 510, determines whether a preset number of DUP-ACKs have been received. Upon failing to receive multiple DUP-ACKs, the wireless device can perform operations to recover the transmission speed as per a typical TCP recovery procedure. This is why the legacy scheme presents a quicker recovery speed where one DUP-ACK is received.

Upon reception of multiple DUP-ACKs, the wireless device can open at least one recovery session in operation 512. The recovery session can be a new session based on the TCP in addition to the current session encountered with the error. The wireless device can transmit and receive data through at least one recovery session newly opened as well as the recovered original session in operation 514. In this case, the use of both the original session and at least one recovery session enables quicker recovery of the transmission speed.

Figure 6A:
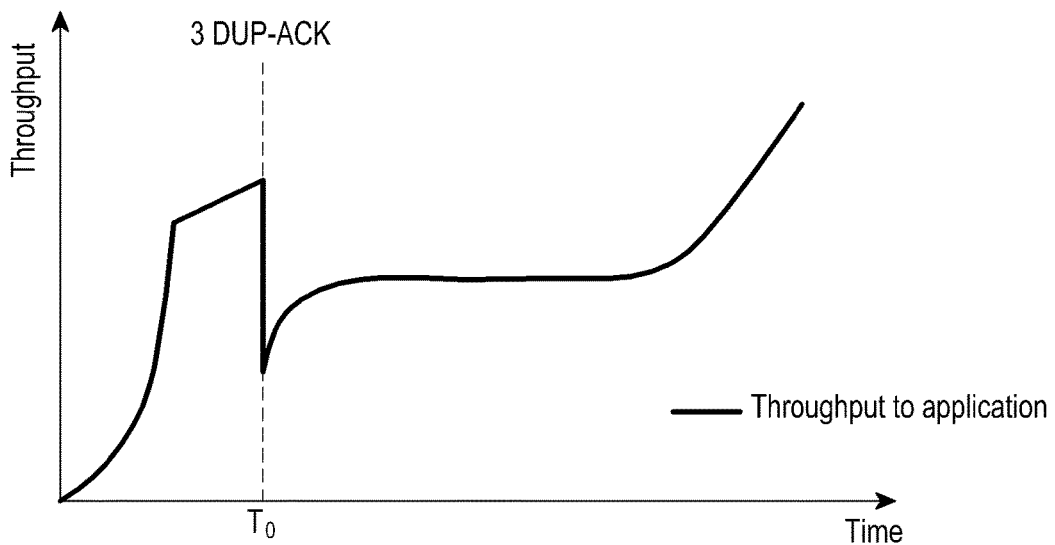
FIGS. 6A and 6B are views illustrating variations in throughput due to error recovery according to an embodiment of the present disclosure.
Figure 6B:
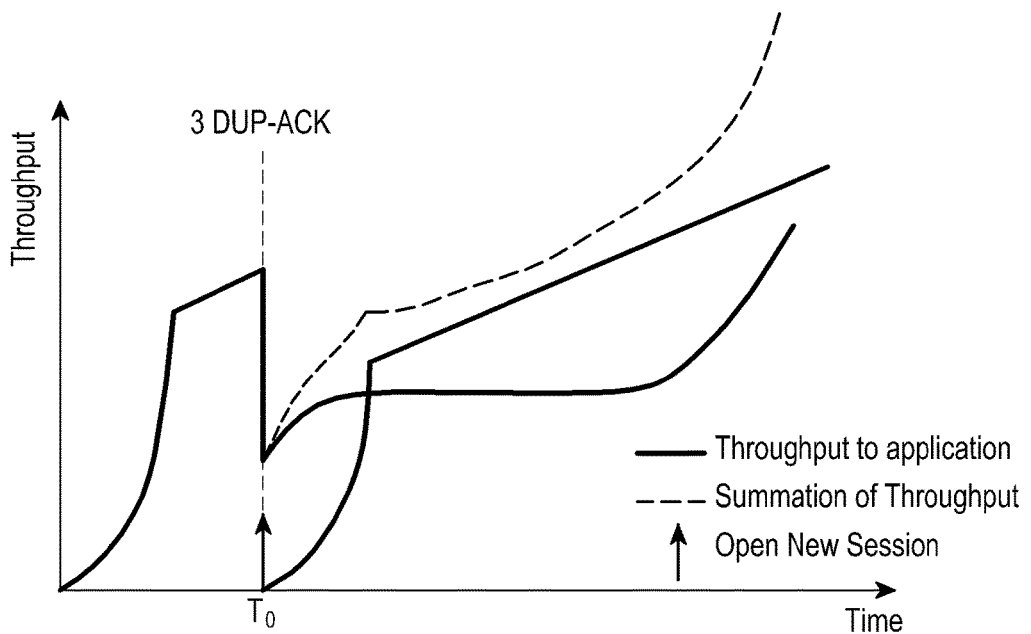

FIGS. 6A and 6B are views illustrating variations in throughput due to error recovery according to an embodiment of the present disclosure.

FIG. 6A illustrates a variation in throughput when a session is recovered by a legacy TCP recovery procedure upon receiving a single DUP-ACK, and FIG. 6B illustrates a variation in throughput by multiple sessions as multiple DUP-ACKs are received.

Referring to FIG. 6B, a new session (recovery session) is initiated at the time T0 that multiple DUP-ACKs are received, and the transmission speed can be recovered through the throughput by the recovered original session and the throughput by at least one new session. In this case, the transmission speed might be recovered more quickly.

Figure 7:
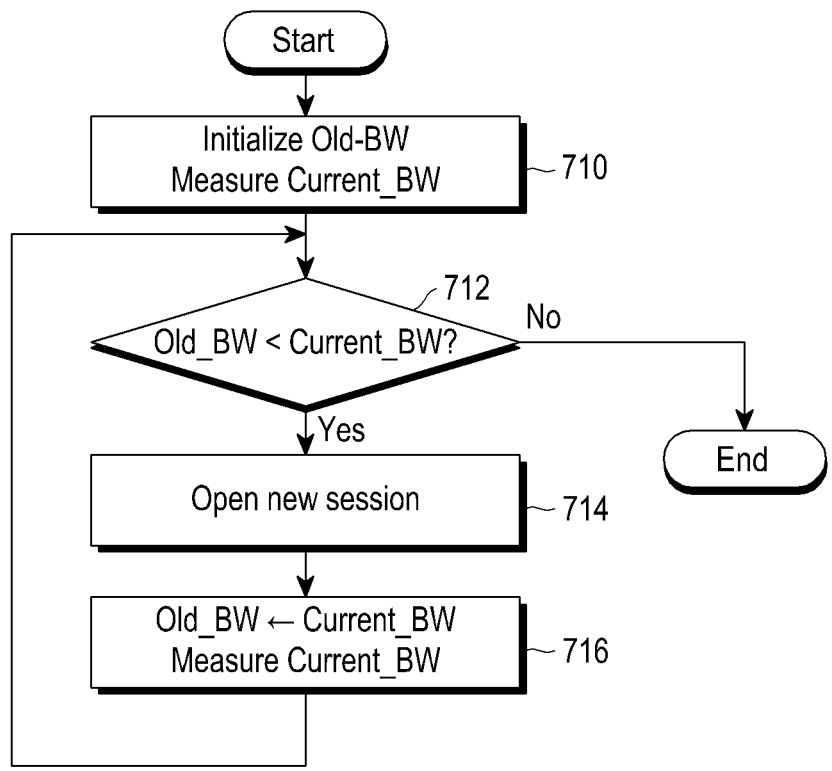
FIG. 7 illustrates a control flow corresponding to an adaptive session recovery procedure for recovering an error caused in a wireless network section in a wireless device according to an embodiment of the present disclosure.

FIG. 7 is a view illustrating a control flow corresponding to an adaptive session recovery procedure for recovering an error caused in a wireless network section in a wireless device according to an embodiment of the present disclosure. The control flow shown in FIG. 7 presents a scheme for rapidly recovering transmission speed based on multiple sessions.

Referring to FIG. 7, the wireless device can initialize the old bandwidth (Old_BW) and measure the current bandwidth (Current_BW), in operation 710, immediately after the session is recovered. For example, initializing the old bandwidth (Old_BW) can correspond to setting the old bandwidth (Old_BW) to '0.'

In operation 712, the wireless device can compare the old bandwidth (Old_BW) with the current bandwidth (Current_BW), and as a result, determine whether the current bandwidth (Current_BW) is larger than the old bandwidth (Old_BW). The current bandwidth (Current_BW) being larger than the old bandwidth (Old_BW) can mean that the transmission speed obtainable by at least one session opened at the current time has not reached a desired transmission speed.

Thus, when the current bandwidth (Current_BW) is larger than the old bandwidth (Old_BW), the wireless device can open a new session in operation 714, and the wireless device can set the current bandwidth (Current_BW) to the old bandwidth (Old_BW) and measure the current bandwidth (Current_BW) again in operation 716.

Upon measuring the current bandwidth (Current_BW) again, the wireless device can return to operation 712 and perform its subsequent operations until the old bandwidth (Old_BW) reaches or exceeds the current bandwidth (Current_BW).

By doing so, the wireless device can secure a desired bandwidth through opening a new session and resume transmission and reception of packets based thereupon.

Figure 8:
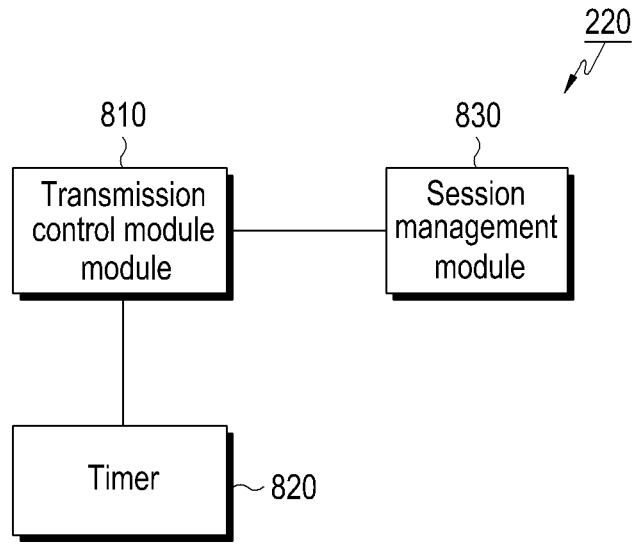
FIG. 8 is a block diagram illustrating a configuration of a control module provided in a wireless device according to an embodiment of the present disclosure.

FIG. 8 is a block diagram illustrating a configuration of a control module provided in a wireless device according to an embodiment of the present disclosure.

Referring to FIG. 8, the control module 220 can include a transmission control module 810, a session management module 830, and a timer 820.

The transmission control module 810 can perform the overall operation for adaptive session recovery based on, e.g., the time of link recovery or error type. When an error occurs on the wired network section, the transmission control module 810 can monitor the time when the link is recovered and control the session management module 830 as per a preset session recovery procedure corresponding to the time of link recovery to recover at least one session.

According to an embodiment of the present disclosure, the transmission control module 810 can previously set three reference values and distinguish times of link recover based on the three preset reference values. The three reference values can be a first to third reference value.

For example, the first reference value can be a reference time for opening a new session, i.e., recovery session, and the first reference value can be, e.g., 'RTO-2RTT.' The second reference value can be the time of requesting initial retransmission, e.g., the first RTO. The third reference value can be the time when the maximum wait time for recovery has elapsed, e.g., Max RTO.

The transmission control module 810 can open a new session a constant value ($\alpha$) after the time corresponding to the first reference value and determine a scheme for transmission speed recovery considering which one of sections differentiated by the first to third reference value the link recover is performed.

As an example, where the link recovery occurs between the time corresponding to the first reference value and the time corresponding to the second reference value, the transmission control module 810 can control the session management module 830 can be operated in a first scheme where transmission speed is recovered by the original session and at least one recovery session newly opened.

As another example, where the link recovery is performed near the time corresponding to the second reference value or between the time corresponding to the second reference value and the time corresponding to the third reference value, the transmission control module 810 can start a procedure for recovering the transmission speed using the earlier in reception of the original session and at least one recovery session and can then be operated in a second scheme where transmission speed is recovered further using an additional session.

As still another example, unless link recovery is done until the time corresponding to the third reference value, the transmission control module 810 can be operated in a third scheme where it gives up further link recovery operations and hands over to another network.

The session management module 830 can recover the original session or open at least one new recovery session under the control of the transmission control module 810.

Further, the session management module 830 can close the original session and at least one opened recovery session under the control of the transmission control module 810.

The timer 820 can detect a time necessary for the transmission control module 810 to determine a scheme for recovering the transmission speed and provide the detected time to the transmission control module 810. For example, the timer 820 can monitor the times corresponding to the first and second reference value and report a result to the transmission control module 810 under the control of the transmission control module 810.

Figure 9A:
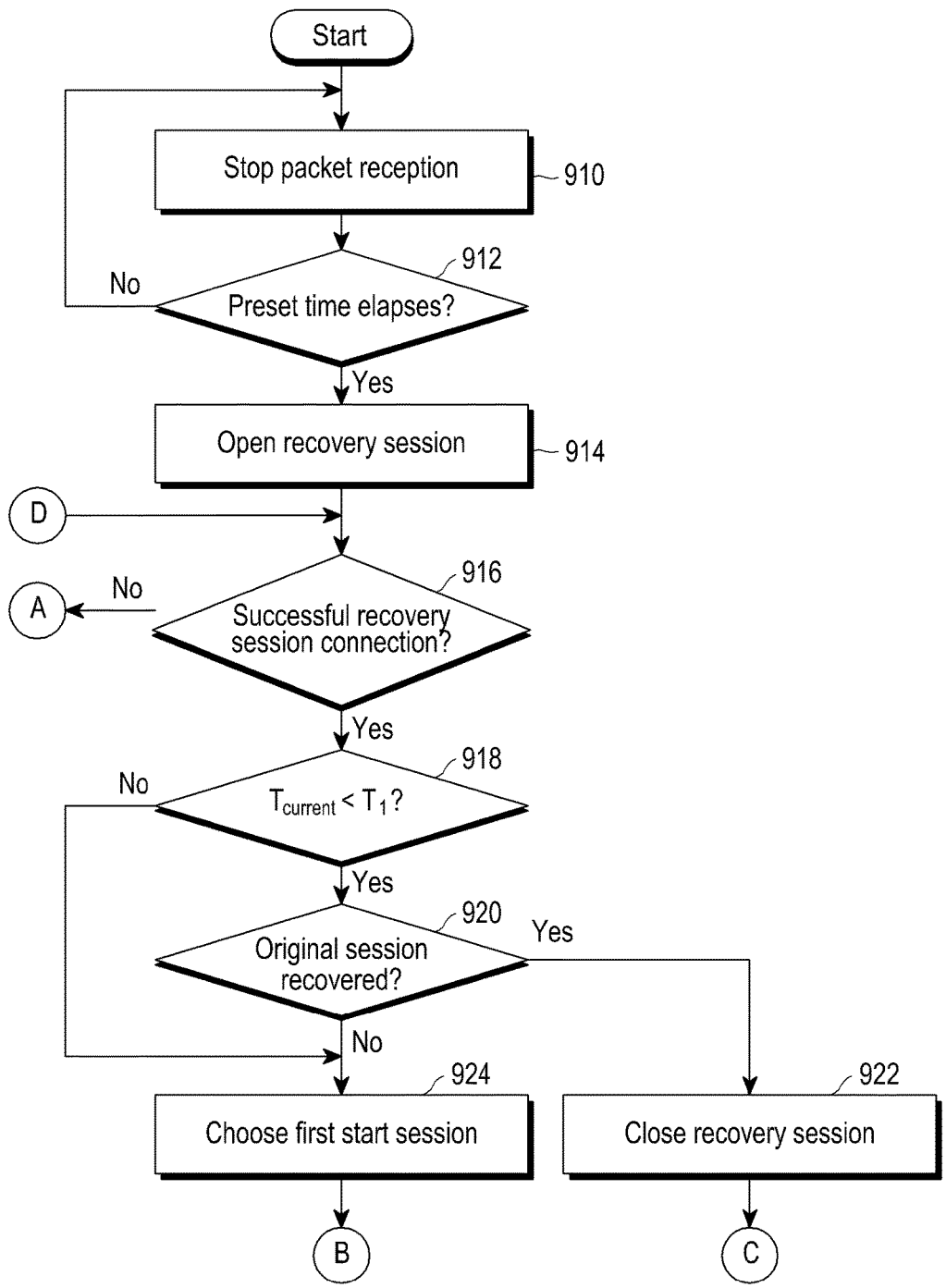
FIGS. 9A and 9B illustrate the control flows for session recovery in a wireless device based on the TCP according to an embodiment of the present disclosure.
Figure 9B:
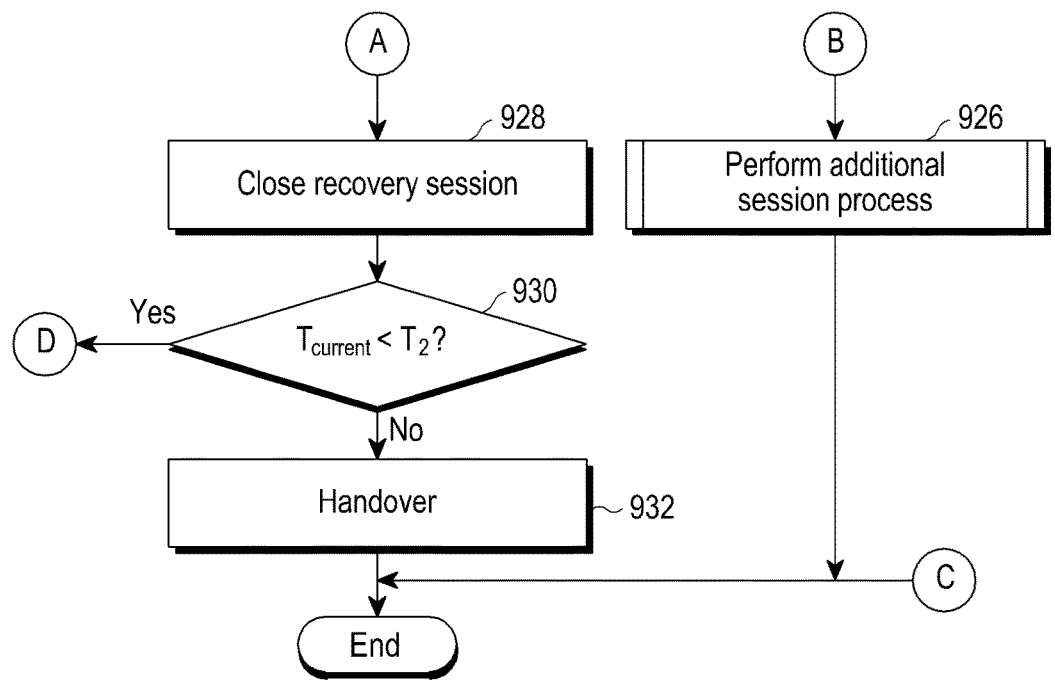

FIGS. 9A and 9B illustrate the control flows for session recovery in a wireless device based on the TCP according to an embodiment of the present disclosure. In other words, FIGS. 9a and 9b illustrate a control flow for recovering transmission speed by schemes previously prepared for link recovery times, respectively.

Referring to FIGS. 9A and 9B, when packet reception stops, the wireless device can recognize that the current session has encountered an error in operation 910. Here, recognizing the stop of packet reception or the occurrence of an error can correspond to recognizing a time-out as defined in the TCP.

In such case, the wireless device monitors whether the time-out context continues until a preset time elapses in operation 912. For example, the preset time can be defined as 'RTO-2RTT.' For example, the continuation of the time-out context can rely on whether the error-encountered session is recovered or not. When error recovery is done, the time-out context can terminate.

Unless link recovery is done until a preset time elapses, the wireless device can open a recovery session in operation 914. The recovery session can mean a session newly opened based on the TCP, not the original session where the error has occurred. For example, a preset time (e.g., 'RTO-2RTT') after the time-out has occurred, the wireless device can wait for a time corresponding to a predetermined constant value ($\alpha$) and can then open at least one recovery session based on the TCP. As an example, a value smaller than the RTT can be set to the predetermined constant value ($\alpha$).

The wireless device determines whether link recovery, i.e., session recovery, succeeds in operation 916. Here, the session for determining whether the recovery succeeds can be the original session with the error. For example, the session recovery can mean a context where normal packet transmission/reception is rendered possible through the session.

Upon succeeding in the session recovery, the wireless device, in operation 918, determines whether the session recovery has been done before a preset threshold time (T1) elapses. The RTO can be set to the preset threshold time (T1). In this case, the wireless device can determine whether the time-out context lasts for a preset threshold time (T1) according to whether the timer value triggered at the time of the occurrence of the time-out, i.e., time-out elapse time (Tcurrent) reaches the RTO.

Unless the time-out elapse time (Tcurrent) passes the preset threshold time (T1), the wireless device identifies whether the original session encountered with the error has been recovered in operation 920.

Upon identifying that the original session has been recovered, the wireless device can close the recovery session in operation 922. In this case, the wireless device can recover the existing transmission speed using the original session recovered at the time that the original session has been recovered (first scheme). For a better transmission rate, however, the wireless device can maintain at least one recovery session and additionally use the maintained, at least one, recovery session for transmission speed recovery.

Upon identifying that the time-out elapse time (Tcurrent) has passed the preset threshold time (T1) or the original session has not been recovered, the wireless device can choose a first coming session in operation 924. For example, the wireless device can choose the earlier in reception of the original session and at least one recovery session as the first coming session.

Upon choosing the first coming session, the wireless device can perform an additional session process in operation 926 (second scheme). For example, the additional session process can be performed based on the control flow described above in connection with FIG. 7. The wireless device can secure an additional throughput by carrying out the additional session process. For example, since the transmission speed can be recovered using all of the original session and at least one recovery session, the wireless device can acquire throughputs by the two sessions.

According to an embodiment of the present disclosure, where the original session is recovered (link recovery) at a time when the time-out elapse time (Tcurrent) imminently passes the first RTO or at a time when the error occurrence elapse time (Tcurrent) has passed the first RTO but not yet the maximum wait tie (T2), the wireless device can perform the additional session process (second scheme). In such case, the wireless device can perform rapid error recovery based on the recovered session.

Upon failure to recovery session connection, the wireless device can close the recovery session in operation 928. Thereafter, the wireless device determines whether the time-out elapse time (Tcurrent) has passed the maximum wait time (T2) in operation 930. For example, a Nth RTO can be set to the maximum wait time (T2). N can be equal or larger than 2 and can be set by the user as an integer within a range not exceeding the maximum RTO (Max RIO).

Unless the time-out elapse time (Tcurrent) has passed the preset maximum wait time (T2), the wireless device can return to operation 914 to open a recovery session and repeatedly perform operations 916 to 930.

Where the time-out elapse time (Tcurrent) has passed the preset maximum wait time (T2), the wireless device, in operation 932, can give up link recovery and hand over to another network. For example, the wireless device can hand over to a network supporting a different communication scheme (e.g., long term evolution (LTE)).

Figure 10:
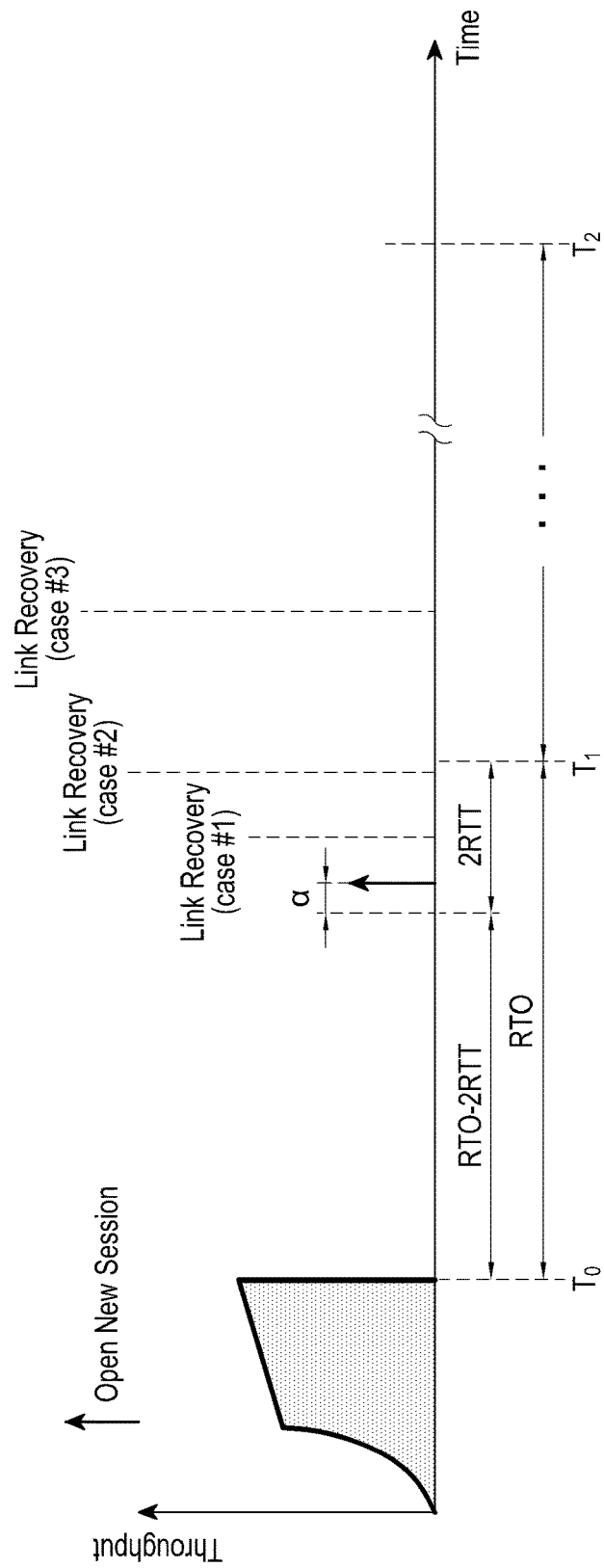
FIG. 10 illustrates a plurality of scenarios considering link recovery times in a wireless device based on the TCP according to an embodiment of the present disclosure.

FIG. 10 illustrates a plurality of scenarios considering link recovery times in a wireless device based on the TCP according to an embodiment of the present disclosure.

Referring to FIG. 10, the wireless device stops receiving packets due to an error occurring at a time (T0). The wireless device can recover the transmission speed based on the scenario corresponding to the time of recovery of link (original session or recovery session) after a time-out occurs during which packet transmission is unavailable at the time (T0).

For example, a preset time (e.g., RTO-2RTT) after the time (T0) of occurrence of the time-out, the wireless device can wait for a time corresponding to a predetermined constant value ($\alpha$) and then open at least one session (recovery session).

When the link is recovered after opening at least one recovery session and before arriving at a time (T1, e.g., RTO) set for initial retransmission, the wireless device can consider it as a first case (case #1) and recover the transmission speed based on the first scenario.

When the link is recovered after opening at least one recovery session and imminently before arriving at a time (T1, e.g., RTO) set for initial retransmission, the wireless device can consider it as a second case (case #2) and recover the transmission speed based on the second scenario.

When the link is recovered after opening at least one recovery session and before arriving at a time (T2, e.g., max RTO) when a preset maximum wait time elapses which is set for abandoning recovery after having passed the time (T1, e.g., RTO) set for initial retransmission, the wireless device can consider it as a third case (case #3) and recover the transmission speed based on the third scenario.

When the link is not recovered after opening at least one recovery session and until after passing the maximum wait time previously set for abandoning recovery after having passed the time (T1, e.g., RTO) set for initial retransmission, the wireless device can consider it as a fourth case (case #4) and recover the transmission speed based on the fourth scenario.

Figure 11:
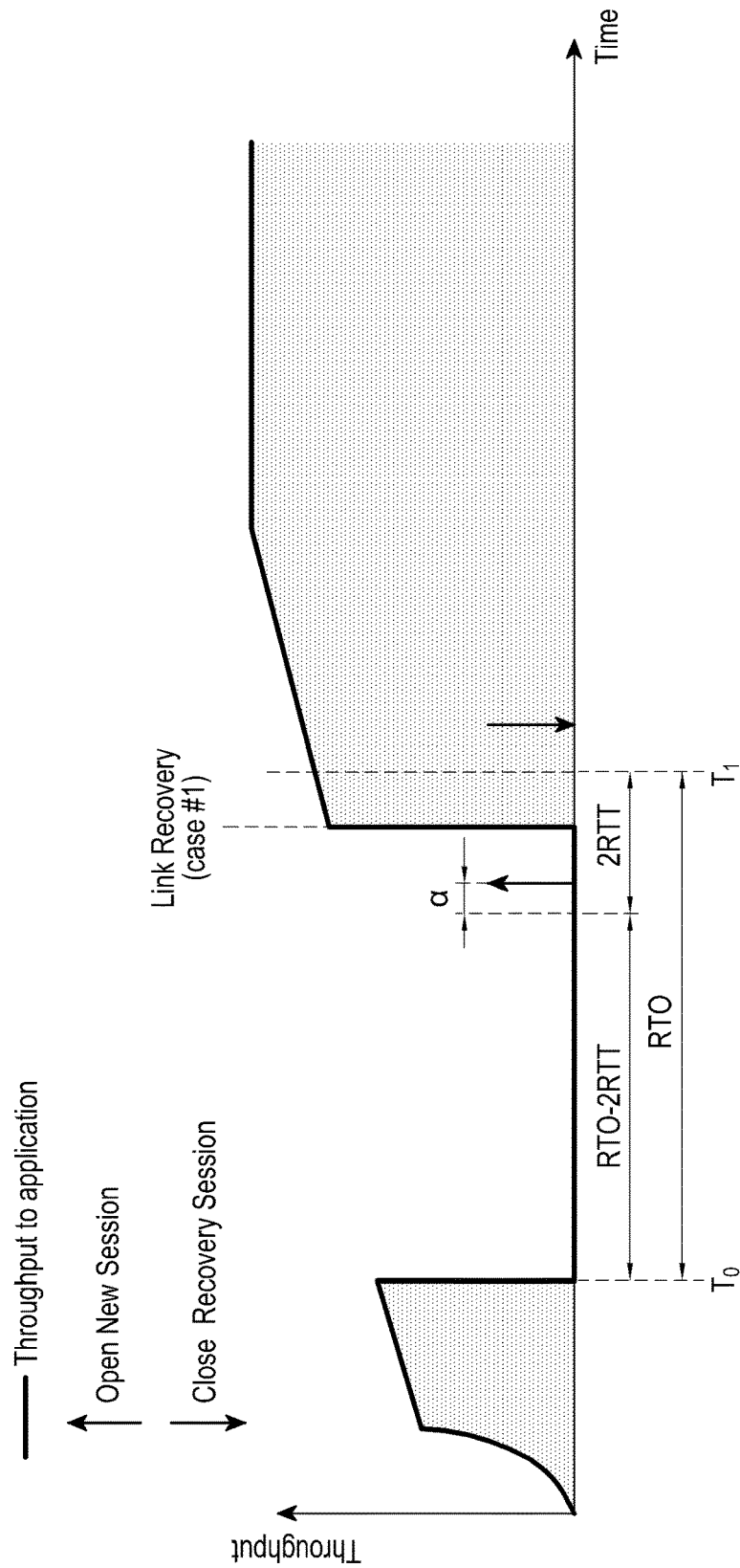
FIG. 11 illustrates an example of recovering a transmission speed based on a first scenario in a wireless device based on the TCP according to an embodiment of the present disclosure.

FIG. 11 is a view illustrating an example of recovering a transmission speed based on a first scenario in a wireless device based on the TCP according to an embodiment of the present disclosure.

Referring to FIG. 11, the wireless device can open a recovery session in a time (e.g., RTO-2RTT) corresponding to the preset first reference value after the time (T0) when the time-out has occurred, plus a time corresponding to a predetermined constant value ($\alpha$).

When the link is recovered a slight time elapse thereafter, the wireless device can recover the transmission speed to the one in the state before the time-out occurs, using the link recovered at the time of recovery. Here, the time of the recovery of the link cannot exceed the time, T1 (RTO), when the initial retransmission is performed. In this case, the wireless device can close the previously opened recovery session a predetermined time after the elapse of the time T1 (RTO) when the initial retransmission is performed.

Figure 12A:
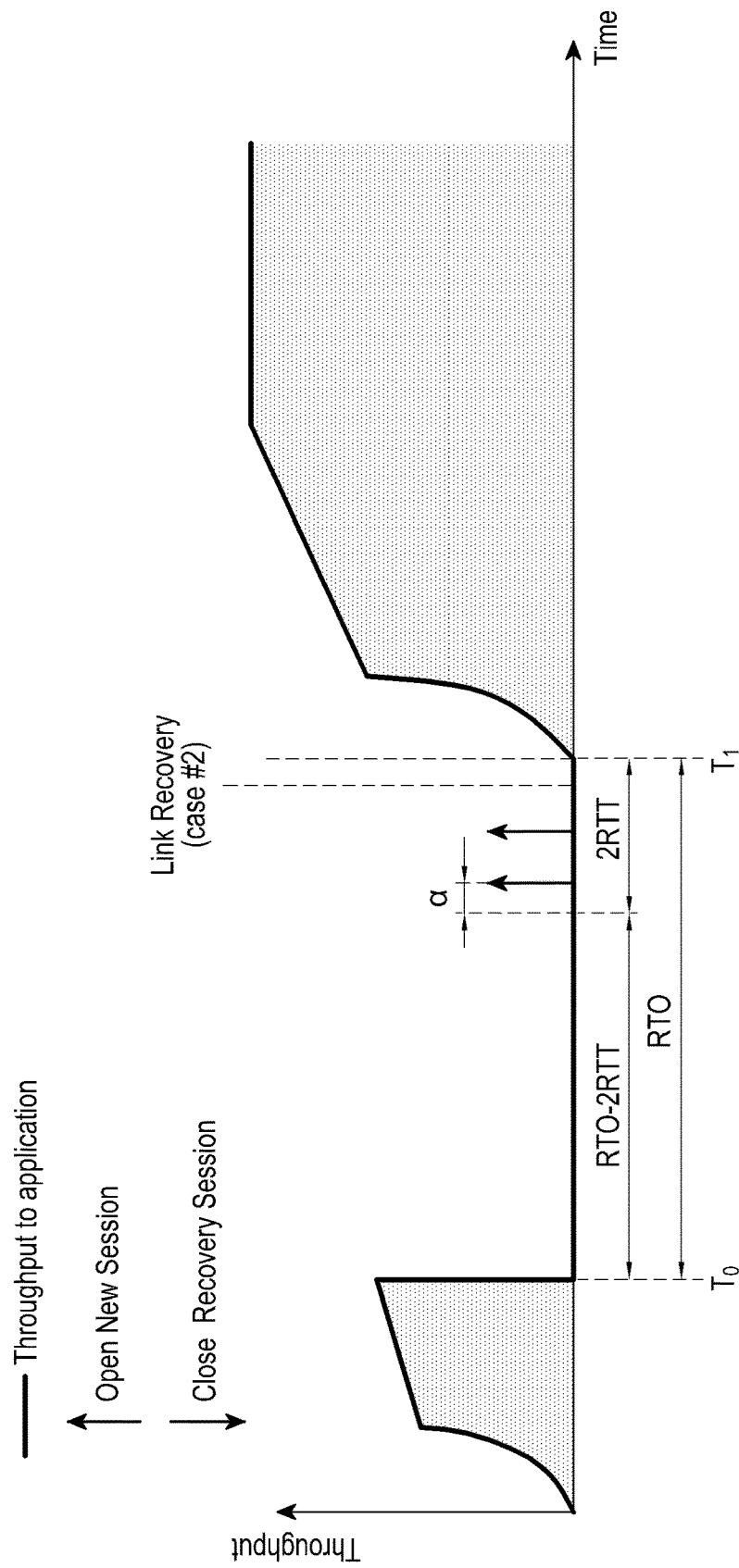
FIGS. 12A and 12B illustrate examples of recovering a transmission speed based on a second scenario in a wireless device based on the TCP according to an embodiment of the present disclosure.
Figure 12B:
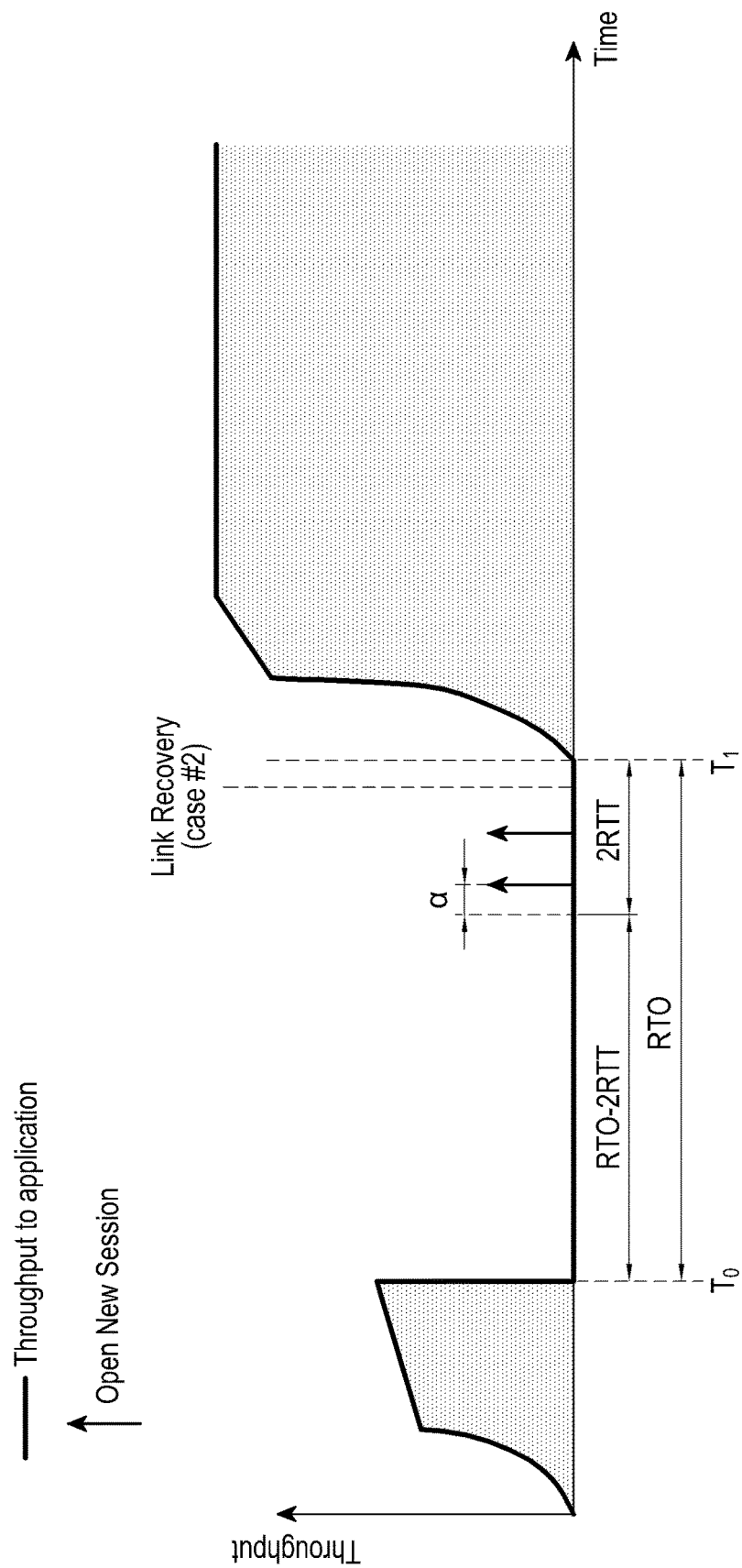

FIGS. 12A and 12B illustrate examples of recovering a transmission speed based on a second scenario in a wireless device based on the TCP according to an embodiment of the present disclosure.

Referring to FIG. 12A, the wireless device can open a recovery session in a time (e.g., RTO-2RTT) corresponding to the preset first reference value after the time (T0) when the time-out has occurred, plus a time corresponding to a predetermined constant value ($\alpha$).

Thereafter, when the link is recovered imminently at the time T1 (RTO) when the initial retransmission is performed, the wireless device can recover the transmission speed to the one in the state before the time-out occurs using the link recovered at the time T1 (RTO) when the initial retransmission is performed.

Referring to FIG. 12B, when the link is recovered imminently at the time T1 (RTO) when the initial retransmission is performed, the wireless device can additionally recover the transmission speed using at least one recovery session opened in addition to the original link corresponding to the session recovered at the time T1 (RTO) when the initial retransmission is performed.

Figure 13A:
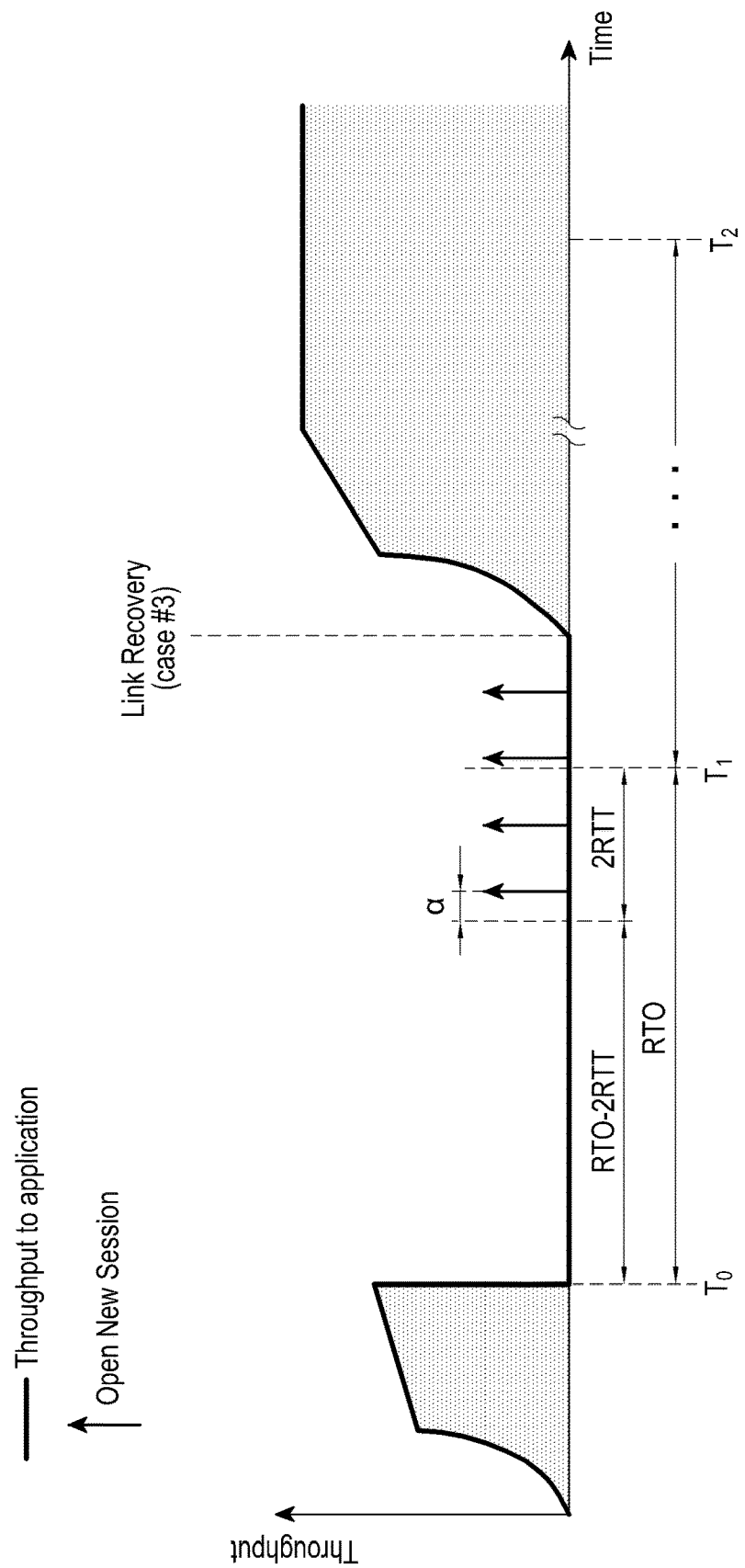
FIGS. 13A and 13B illustrate examples of recovering a transmission speed based on a third scenario in a wireless device based on the TCP according to an embodiment of the present disclosure.
Figure 13B:
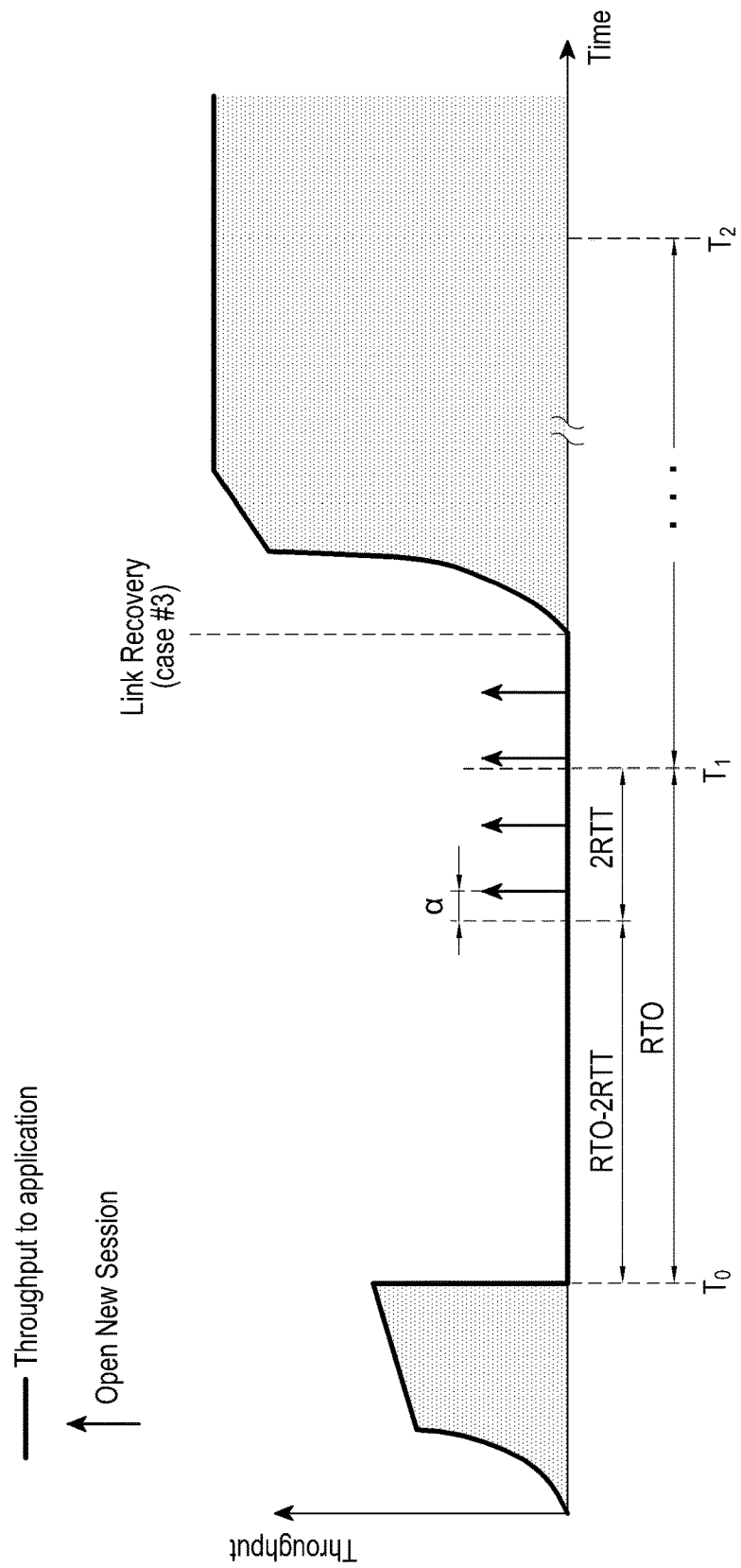

FIGS. 13A and 13B illustrate examples of recovering a transmission speed based on a third scenarios in a wireless device based on the TCP according to an embodiment of the present disclosure.

Referring to FIG. 13A, the wireless device can open a recovery session in a time (e.g., RTO-2RTT) corresponding to the preset first reference value after the time (T0) when the time-out has occurred, plus a time corresponding to a predetermined constant value (α).

Thereafter, when the link is recovered after the elapse of the time T1 (RTO) when the initial retransmission is performed, the wireless device can recover the transmission speed to the one in the state before the time-out occurs using the recovered link at the time of the link recovery.

Referring to FIG. 13B, when the link is recovered after the elapse of the time T1 (RTO) when the initial retransmission is performed, the wireless device can additionally recover the transmission speed using at least one recovery session opened in addition to the original link corresponding to the session recovered at the time of the link recovery.

Figure 14:
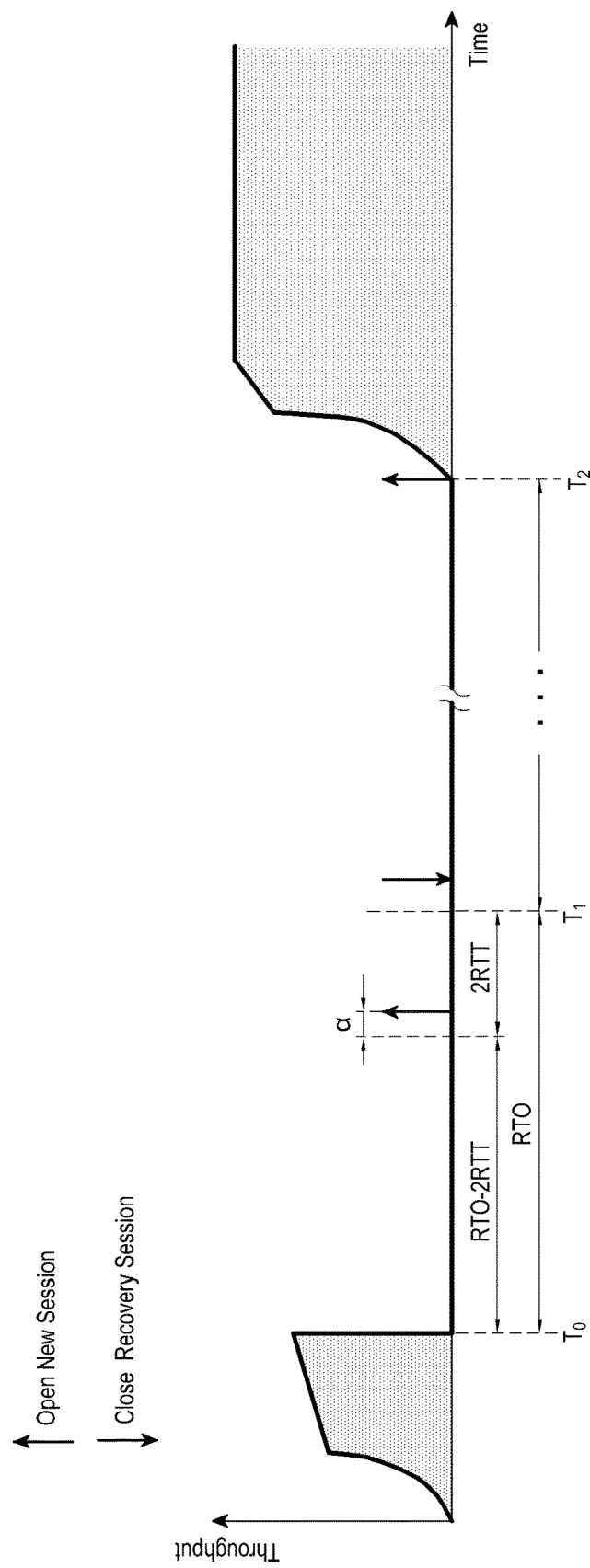
FIG. 14 illustrate an example of recovering a transmission speed based on a fourth scenario in a wireless device based on the TCP according to an embodiment of the present disclosure.

FIG. 14 illustrates an example of recovering a transmission speed based on a fourth scenario in a wireless device based on the TCP according to an embodiment of the present disclosure.

Referring to FIG. 14, the wireless device can open a recovery session in a time (e.g., RTO-2RTT) corresponding to the preset first reference value after the time (T0) when the time-out has occurred, plus a time corresponding to a predetermined constant value (α).

Thereafter, unless the link is recovered until the time T2 when the maximum wait time set for link recovery has elapsed, the transmit device can hand over to another network. The transmit device can recover the transmission speed to the one before the time-out occurs through the handover to the other network. In this case, the wireless device can close the previously opened recovery session a predetermined time after the elapse of the time T1 (RIO) when the initial retransmission is performed.

Figure 15A:
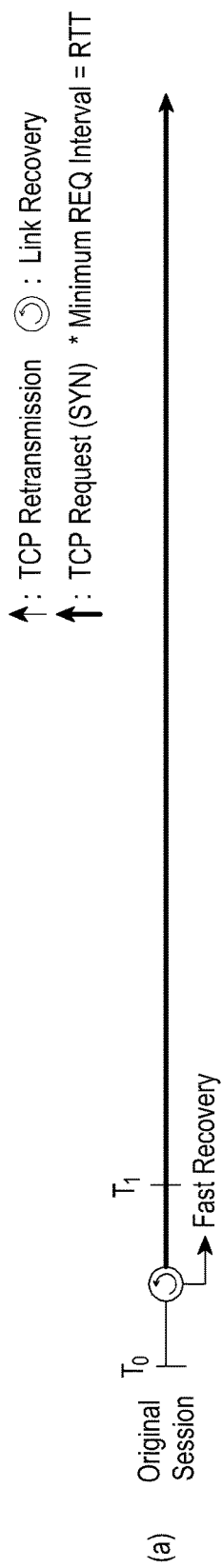
FIGS. 15A to 15C illustrate examples of using a session for transmission speed recovery per link recovery time in a wireless device based on the TCP according to an embodiment of the present disclosure.
Figure 15B:
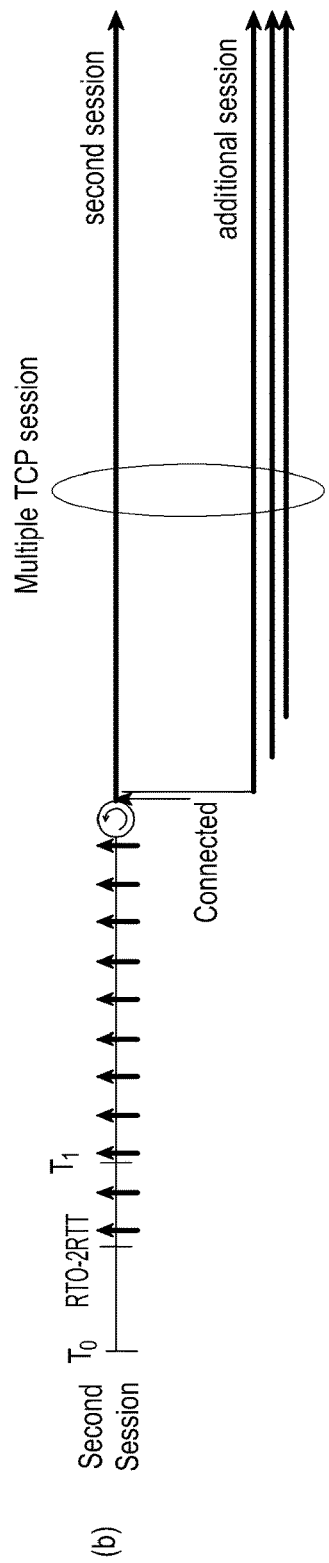
Figure 15C:

FIGS. 15A, 15B and 15C illustrate examples of using a session for transmission speed recovery per link recovery time in a wireless device based on the TCP according to an embodiment of the present disclosure.

Referring to FIG. 15A, when the link recovery is achieved after the time-out occurred at T0 and before arriving at the time (T1, RTO) when initial retransmission is attempted, the wireless device can quickly recover the transmission speed to the one in the state before the time-out occurs by performing fast recovery.

When the link is recovered upon elapse of the time (T1, RTO) when the initial retransmission is attempted after the time-out occurred at T0 and before the maximum wait time set for link recovery elapses, the wireless device can quickly recover the transmission speed using multiple TCP sessions including at least one recovery session newly opened between the preset time (RTO-2RTT) after T0 and the time of link recovery and the original session corresponding to the recovered link as shown in FIG. 15B.

Unless the link is recovered after the time-out occurred at T0 and until the preset maximum wait time elapses, the wireless device can abandon link recovery and hand over to another network (e.g., a LTE network) as shown in FIG. 15C.

Figure 16:
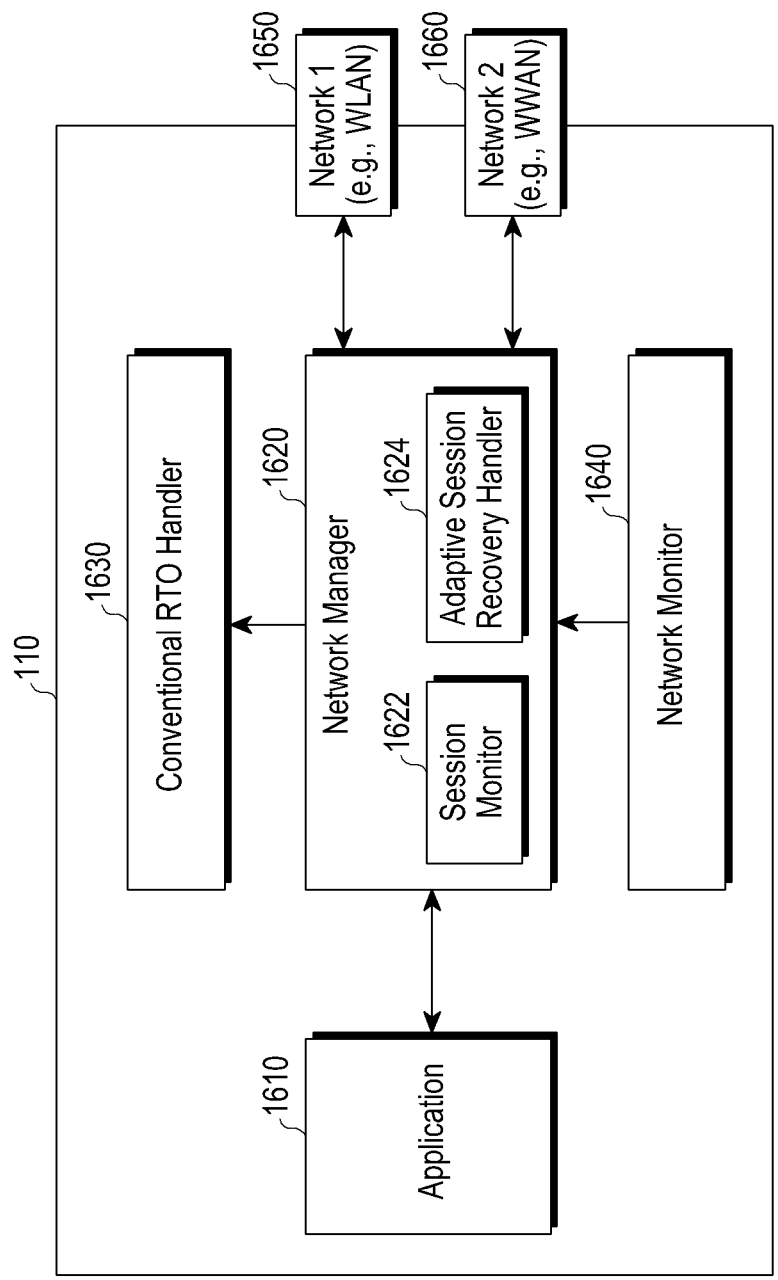
FIG. 16 is a block diagram illustrating a configuration of a wireless device in light of the function of each element of the wireless device, according to an embodiment of the present disclosure.

FIG. 16 is a block diagram illustrating a configuration of a wireless device in light of the function of each element of the wireless device, according to an embodiment of the present disclosure.

Referring to FIG. 16, a wireless device 110 can include an application 1610, a network manager 1620, a RTO handler 1630, a network monitor 1640, and network interfaces (network 1 and network 2) 1650 and 1660. The network manager 1620 can include a session monitor 1622 and an adaptive session recovery handler 1624.

The application 1610 can support functions drivable on the wireless device 110 and accordingly manage data process and transmission/reception. For example, the application 1610 can send a request for data transmission to the network manager 1620 and receive a response from the network manager 1620.

The network manager 1620 can transmit and receive data to/from a server 130 through a network based on a communication protocol, e.g., TCP. The network manager 1620 can receive an error state from the network monitor 1640. The error state can indicate a time when link recovery is achieved.

The network manager 1620 can determine a scheme for recovering transmission speed as per link recovery based on the error state received from the network monitor 1640. The network manager 1620 can perform operations for recovering transmission speed as per link recovery based on the determined scheme.

According to an embodiment of the present disclosure, where the error state indicates that the link has been recovered after a time-out occurred and before the time (T1, RTO) of attempt of initial retransmission, the network manager 1620 can notify the RTO handler 1630 that the link (original session) used to be with an error has been recovered. Thus, the network manager 1620 and the server 130 can transmit or receive data at the transmission speed that is the one before the error occurs, using the recovered original session.

According to an embodiment of the present disclosure, where the error state indicates that the link was recovered after a time-out has occurred and after the time (T1, RTO) of attempt of initial retransmission, the network manager 1620 can determine to recover the transmission speed using multiple sessions. To that end, the network manager 1620 can open at least one new recovery session other than the original session and can transmit or receive data at the transmission speed recovered using the original session and the, at least one, recovery session.

According to an embodiment of the present disclosure, where the error state indicates that the error has not been recovered after the time-out occurred and even after a preset maximum wait time (T2, Max RTO) has passed, the network manager 1620 can determine to abandon link recovery and hand over to another network. In this case, the network manager 1620 can hand over the other network (e.g., a LTE network) and can then transmit or receive data through the other network.

The network manager 1620 can report the result of transmission and reception of data to the application 1610.

When normal data transmission/reception stops due to, e.g., packet loss (DUP-ACK) in the current session or impossibility (e.g., time-out) of packet transmission for a predetermined time, the network monitor 1640 can monitor whether the link corresponding to the session is recovered. Upon sensing the recovery of the link, the network monitor 1640 can report the error state as per the time of recovery to the network manager 1620.

The RTO handler 1630 can receive the report of the occurrence of time-out from the network manager 1620. The RTO handler 1630 can manage the RTO for retransmission upon occurrence of the time-out. The RTO management can be similar to the scheme typically performed for congestion control under the TCP.

Figure 17:
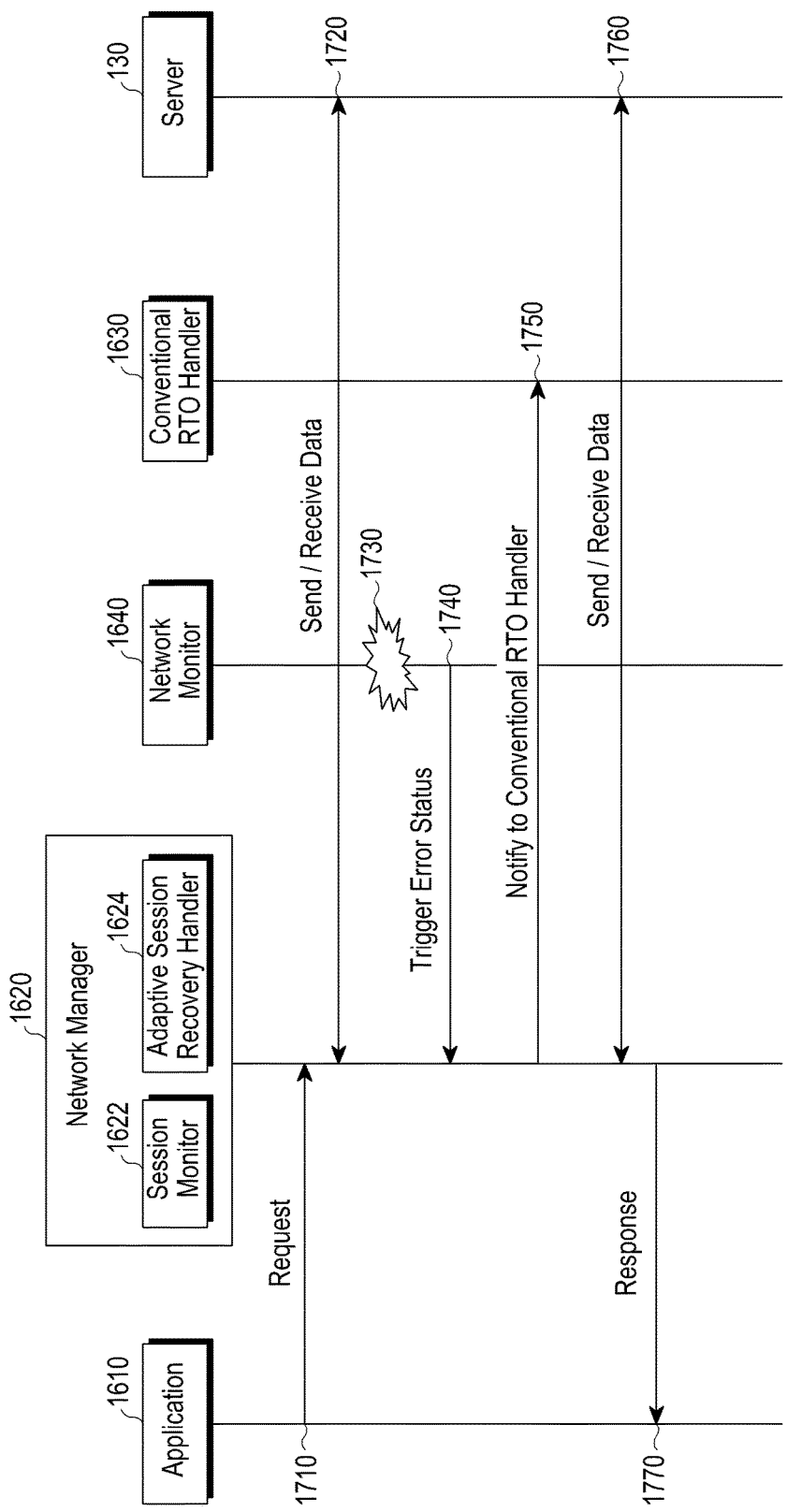
FIG. 17 illustrates a signal processing procedure in a wireless device under the first scenario according to an embodiment of the present disclosure.

FIG. 17 is a view illustrating a signal processing procedure in a wireless device under the first scenario according to an embodiment of the present disclosure. Here, the first scenario assumes that link recovery is achieved before T1.

Referring to FIG. 17, the application 1610 can send a request for packet transmission to the network manager 1620 (operation 1710). Upon receiving the request for packet transmission from the application 1610, the network manager 1620 can transmit or receive data to/from the server 130 based on the TCP (operation 1720).

When an error occurs (operation 1730) under the data transmission or reception, the network monitor 1640 can recognize the same. Upon recognizing the occurrence of the error, the network monitor 1640 can monitor the network state after the occurrence of the error and can identify that the original session encountered with the error is recovered before the time (T1, RTO) of the attempt of initial retransmission. In this case, the network monitor 1640 can report the context to the network manager 1620 (operation 1740).

Having recognized that the error state has been recovered before the time (T1, RTO) that the initial retransmission was attempted, the network manager 1620 can notify the RTO handler 1630 that the link (recovery session) subject to the error state has been recovered (operation 1750). Thus, the network manager 1620 and the server 130 can transmit or receive data at the transmission speed that is the one before the error occurs, using the recovered original session (operation 1760).

The network manager 1620, upon completion of the data transmission and reception, can report the same to the application 1610 (operation 1770).

Figure 18:
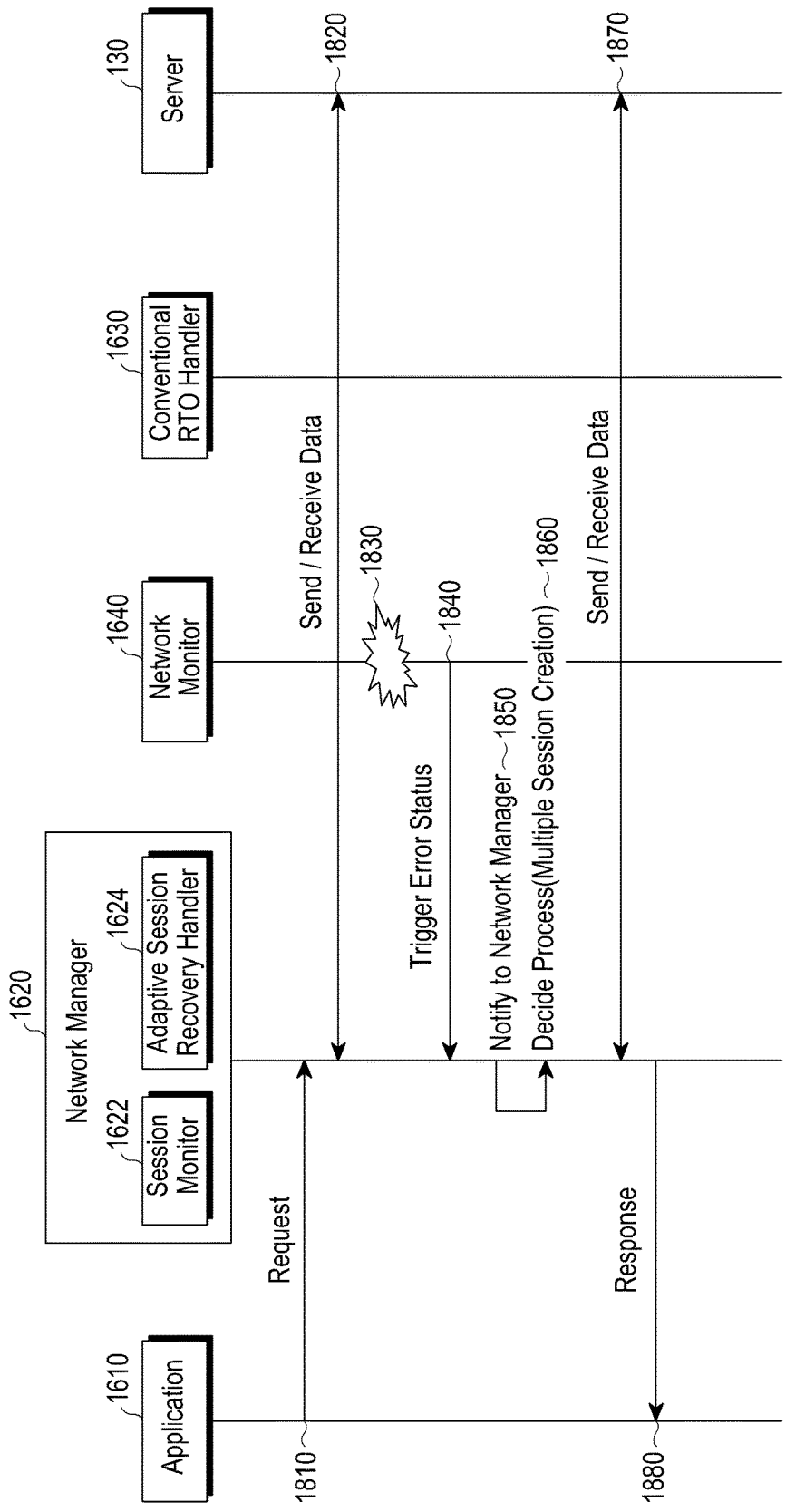
FIG. 18 illustrates a signal processing procedure in a wireless device under the second and third scenario according to an embodiment of the present disclosure.

FIG. 18 is a view illustrating a signal processing procedure in a wireless device under the second and third scenario according to an embodiment of the present disclosure. Here, the second and third scenario assumes that link recovery is achieved imminently at T1 or before T2. The time imminent to T1 can be a time left to such an extent as to render it difficult to perform transmission at T1 after the link recovery has been recognized.

Referring to FIG. 18, the application 1610 can send a request for packet transmission to the network manager 1620 (operation 1810). Upon receiving the request for packet transmission from the application 1610, the network manager 1620 can transmit or receive data to/from the server 130 based on the TCP (operation 1820).

When an error occurs (operation 1830) under the data transmission or reception, the network monitor 1640 can recognize the same. Upon recognizing the occurrence of the error, the network monitor 1640 can monitor the network state after the occurrence of the error and can identify that the original session encountered with the error is recovered after the time (T1, RTO) of the attempt of initial retransmission. In this case, the network monitor 1640 can report the context to the network manager 1620 (operation 1840).

Having recognized that the error state has been recovered after the time (T1, RTO) that the initial retransmission was attempted, the network manager 1620 can notify, on its own, that the link (recovery session) subject to the error state has been recovered (operation 1850). In this case, the network manager 1620 can determine to recover the transmission speed using multiple sessions (operation 1860). To that end, the network manager 1620 can open at least one new recovery session other than the original session.

The network manger 1620 can transmit or receive data at the transmission speed recovered using the multiple sessions including at least one new recovery session as well as the recovered original session (operation 1870).

The network manager 1620, upon completion of the data transmission and reception, can report the same to the application 1610 (operation 1880).

Figure 19:
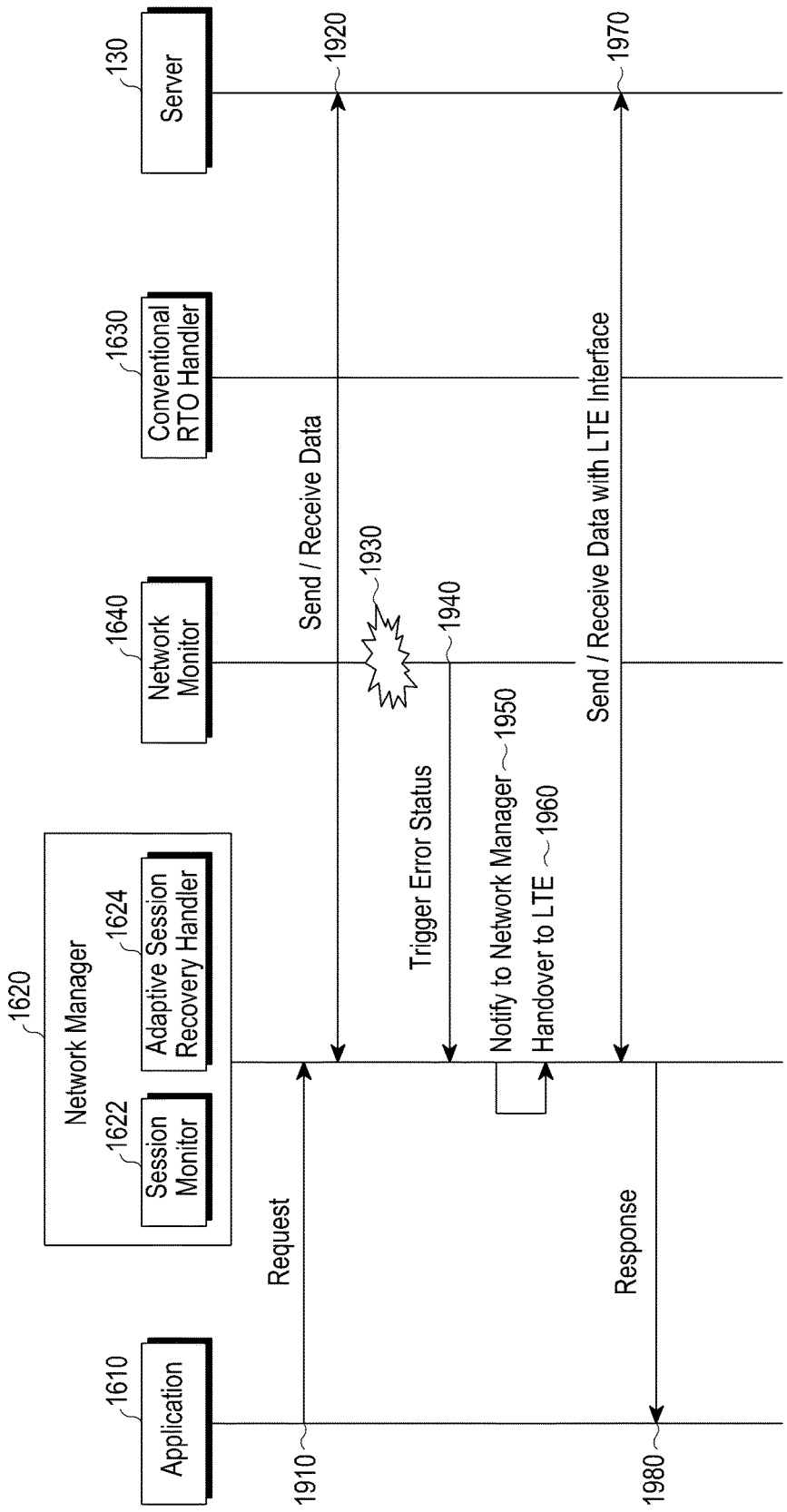
FIG. 19 illustrates a signal processing procedure in a wireless device under the fourth scenario according to an embodiment of the present disclosure.

FIG. 19 is a view illustrating a signal processing procedure in a wireless device under the fourth scenario according to an embodiment of the present disclosure. Here, the fourth scenario assumes that link recovery is not achieved before T2.

Referring to FIG. 19, the application 1610 can send a request for packet transmission to the network manager 1620 (operation 1910). Upon receiving the request for packet transmission from the application 1610, the network manager 1620 can transmit or receive data to/from the server 130 based on the TCP (operation 1920).

When an error occurs (operation 1830) under the data transmission or reception, the network monitor 1640 can recognize the same. Upon recognizing the occurrence of the error, the network monitor 1640 can monitor the network state after the occurrence of the error and can identify that the original session encountered with the error is not recovered until after the maximum wait time (T2, Max RTO) preset for link recovery elapses. In this case, the network monitor 1640 can report the context to the network manager 1620 (operation 1940).

Having recognized that the error state is not recovered until after the elapse of the preset maximum wait time (T2, Max RTO), the network manager 1620 can report the same on its own (operation 1950). In this case, the network manager 1620 can determine to abandon link recovery and hand over to another network, and as per such determination, hand over to the other network (e.g., a LTE network) (operation 1960). To that end, the network manager 1620 can transmit or receive data through the other network (operation 1970).

The network manager 1620, upon completion of the data transmission and reception, can report the same to the application 1610 (operation 1980).

Figure 20:
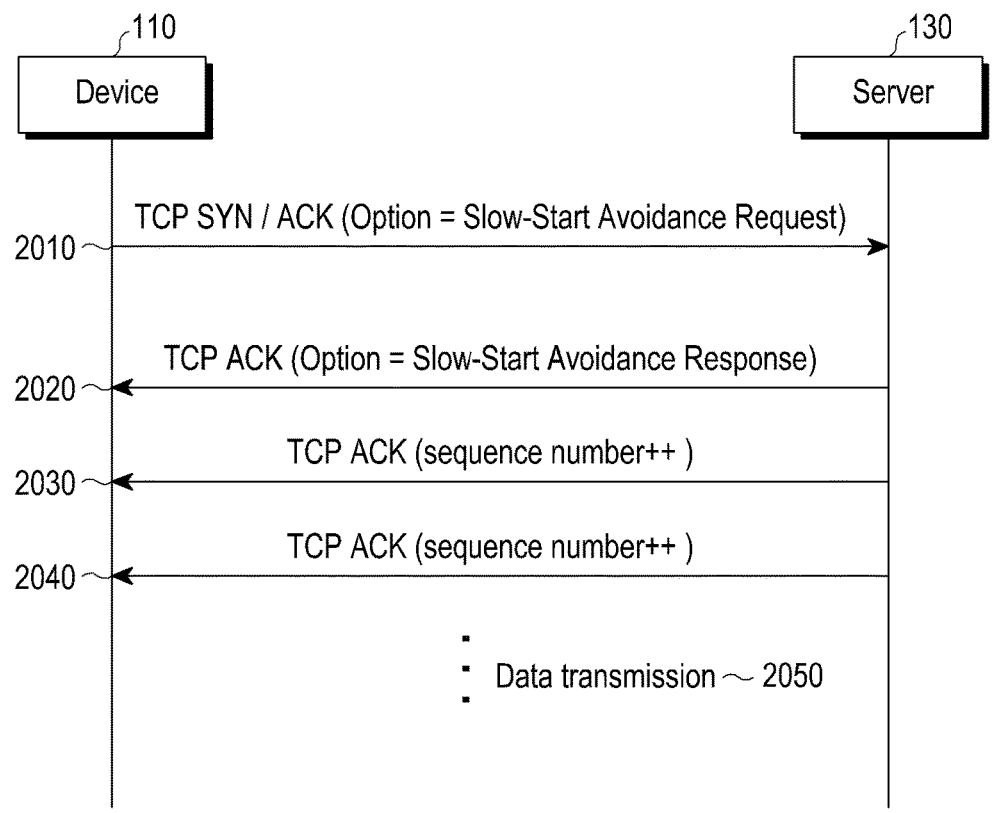
FIG. 20 illustrates a signaling procedure for recovering a transmission speed after a RTO occurs in a TCP-based network according to an embodiment of the present disclosure.

FIG. 20 is a view illustrating a signaling procedure for recovering a transmission speed after a RTO occurs in a TCP-based network according to an embodiment of the present disclosure.

Referring to FIG. 20, upon recovering the transmission speed by link recovery after the occurrence of RTO, the wireless device 110 can transmit a TCP SYN/ACK message to the server 130 (operation 2010). In this case, the wireless device 110 can define information requesting slow start avoidance (slow-start avoidance request) and carry the slow-start avoidance request over an option field constituting the TCP SYN/ACK. The slow-start avoidance request can be one for the purpose of requesting that the CWND size prior to a time-out be maintained.

The server 130, upon receiving the TCP SYN/ACK containing the slow-start avoidance request in the option field, can maintain the CWND size prior to the time-out. The server 130 can transmit a TCP ACK message to the wireless device 110 in response to the TCP SYN/NACK message. In this case, the server 130 can define information responsive to the slow-start avoidance request—slow-start avoidance response—and carry the slow-start avoidance response over an option field constituting the TCP ACK message.

As an example, reserved fields (79 bits to 252 bits) in the messages can be used as the option field containing the slow-start avoidance request in the TCP SYN/ACK message and the option field containing the slow-start avoidance response in the TCP ACK message.

The server 130 can transmit the TCP ACK containing a sequence number to the wireless device 110 at a preset period.

The wireless device 110 and the server 130 can maintain the original CWND size by exchanging the slow-start avoidance request and the slow-start avoidance response.

Therefore, upon entering into the slow-start avoidance process, the wireless device 110 can send data using the CWND size that it retains (operation 2050). Since the wireless device 110 uploads, the wireless device 110 can start to transmit data using the maximum CWND size without notifying the server 130.

Figure 21:
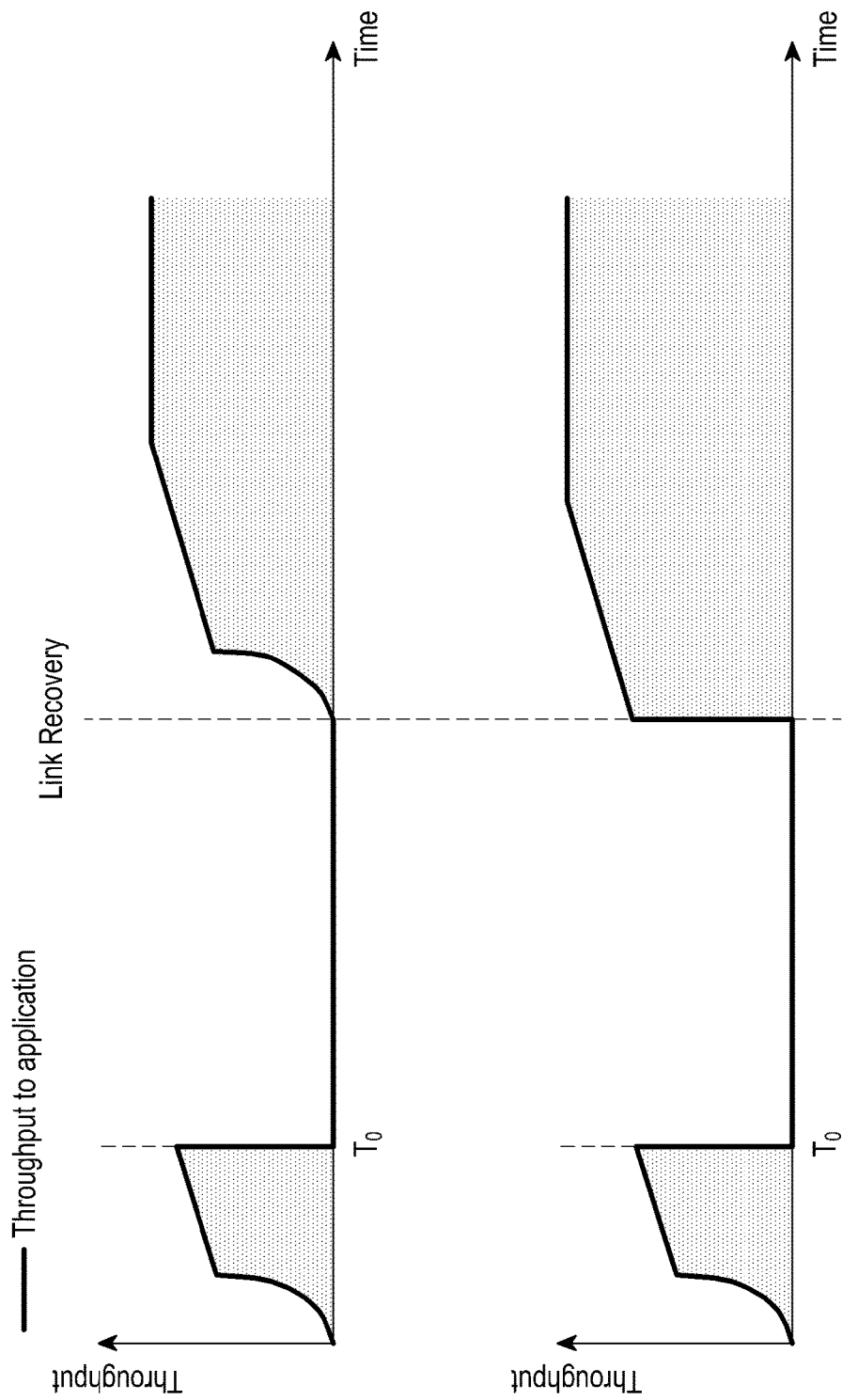
FIG. 21 illustrates an example of transmission speed recovery if a link is recovered in a TCP-based network according to an embodiment of the present disclosure.

FIG. 21 is a view illustrating an example of transmission speed recovery when a link is recovered in a TCP-based network according to an embodiment of the present disclosure.

Referring to FIG. 21, it can be verified that when the wireless device and server do not maintain the CWND size, recovery of the original CWND size after link recovery takes a predetermined time as shown in the upper part of FIG. 21. Where the wireless device and the server maintain the CWND size, it, however, can be verified that the original transmission speed can be recovered right after link recovery as shown in the lower part of FIG. 21.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims. Thus, the scope of the present disclosure should not be limited to the above-described embodiments, and should rather be defined by the following claims and equivalents thereof. Further, such modified embodiments should not be individually appreciated from the technical spirit or scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing an adaptive session recovery by a wireless device supporting a transmission communication protocol in a high-speed wireless network, the method comprising:
    opening at least one recovery session a preset time after a time-out occurs in an original session;
    monitoring whether a link recovery is achieved after the at least one recovery session is opened and before a preset maximum wait time elapses; and
    if the link recovery is achieved, recovering a transmission speed according to a criterion corresponding to a time when the link recovery is achieved,
    wherein recovering the transmission speed comprises, if the link recovery is achieved after the at least one recovery session is opened and between a time of attempting initial retransmission and the preset maximum wait time, recovering the transmission speed using the at least one recovery session and the original session at the time when the link recovery is achieved.

2. The method of claim 1, further comprising:
    determining whether an error causing the time-out occurs on a wireless network section or a wired network section, wherein the recovery of the transmission speed is performed based on the adaptive session recovery if the error occurs only on the wireless network section.

3. The method of claim 2, wherein determining whether the error causing the time-out occurs on the wireless network section or the wired network section comprises:
    determining whether a section where the error occurs is the wireless network section based on a degree of a correlation between a wireless link parameter and a transmission control protocol (TCP) parameter,
    wherein the wireless link parameter includes at least one of a signal strength or a packet transmission rate, and the TCP parameter includes at least one of a TCP performance, a retransmission rate, or a number of duplicate acknowledges (DUP-ACKs).

4. The method of claim 3, wherein determining whether the error causing the time-out occurs on the wireless network section or the wired network section comprises, if the wireless link parameter and the TCP parameter are smaller than a preset threshold, determining that the section where the error occurs is the wireless network section.

5. The method of claim 1, wherein recovering the transmission speed comprises, if the link recovery is achieved after the at least one recovery session is opened and before attempting initial retransmission, recovering the transmission speed using a congestion window size used before the time-out occurs and closing the at least one recovery session opened.

6. The method of claim 1, wherein recovering the transmission speed comprises, if the link recovery is achieved after the at least one recovery session is opened and a predetermined adjacent time before a time of attempting initial retransmission, recovering the transmission speed using the at least one recovery session and the original session at the time of attempting the initial retransmission.

7. The method of claim 1, wherein recovering the transmission speed using the at least one recovery session and the original session further comprises:
    measuring a current bandwidth based on at least one session;
    comparing an original bandwidth with the measured current bandwidth;
    if the original bandwidth is smaller than the measured current bandwidth, updating the original bandwidth with the current bandwidth; and
    if the original bandwidth is equal or larger than the measured current bandwidth, recovering the transmission speed using the at least one session, wherein if the original bandwidth is smaller than the measured current bandwidth, a session newly generated is included in a session for measuring a subsequent current bandwidth.

8. The method of claim 1, wherein recovering the transmission speed further comprises, unless the link recovery is achieved after the at least one recovery session is opened and until after the preset maximum wait time elapses, performing a handover to another network.

9. The method of claim 1, wherein the preset time for opening the recovery session after the time-out occurs in the original session is a time delayed from the time when the time-out occurs by a time corresponding to a first retransmission period minus two round trip times (RTTs) plus a predetermined constant time.

10. A wireless device supporting a transmission communication protocol in a high-speed wireless network, the wireless device comprising:
    a communication module; and
    a control module configured to:
        open at least one recovery session a preset time after a time-out occurs in an original session;
        monitor whether link recovery is achieved after the at least one recovery session is opened and before a preset maximum wait time elapses; and
        if the link recovery is achieved, recover a transmission speed according to a criterion corresponding to a time when the link recovery is achieved, wherein if the link recovery is achieved after the at least one recovery session is opened and between a time of attempting initial retransmission and the preset maximum wait time, the control module is configured to recover the transmission speed using the at least one recovery session and the original session at the time when the link recovery is achieved.

11. The wireless device of claim 10, wherein the control module is configured to determine whether an error causing the time-out occurs on a wireless network section or a wired network section, wherein the recovery of the transmission speed is performed based on adaptive session recovery if the error occurs only on the wireless network section.

12. The wireless device of claim 11, wherein the control module is configured to determine whether a section where the error occurs is the wireless network section based on a degree of a correlation between a wireless link parameter and a transmission control protocol (TCP) parameter, wherein the wireless link parameter includes at least one of a signal strength and a packet transmission rate, and the TCP parameter includes at least one of a TCP performance, a retransmission rate, or a number of duplicate acknowledges (DUP-ACKs).

13. The wireless device of claim 12, wherein if the wireless link parameter and a TCP parameter are smaller than a preset threshold, the control module is configured to determine that the section where the error occurs is the wireless network section.

14. The wireless device of claim 10, wherein if the link recovery is achieved after the at least one recovery session is opened and before attempting initial retransmission, the control module is configured to recover the transmission speed using a congestion window size used before the time-out occurs and closes the at least one recovery session opened.

15. The wireless device of claim 10, wherein if the link recovery is achieved after the at least one recovery session is opened and a predetermined adjacent time before a time of attempting initial retransmission, the control module is configured to recover the transmission speed using the at least one recovery session and the original session at the time of attempting the initial retransmission.

16. The wireless device of claim 10, wherein the control module is configured to measure a current bandwidth based on at least one session, if the original bandwidth is smaller than the measured current bandwidth, updates the original bandwidth with the current bandwidth, and if the original bandwidth is equal or larger than the measured current bandwidth, recovers the transmission speed using the at least one session, wherein if the original bandwidth is smaller than the measured current bandwidth, a session newly generated is included in a session for measuring a subsequent current bandwidth.

17. The wireless device of claim 10, wherein unless the link recovery is achieved after the at least one recovery session is opened and until after the preset maximum wait time elapses, the control module performs a handover to another network.

18. The wireless device of claim 10, wherein the preset time for opening the recovery session after the time-out occurs in the original session is a time delayed from the time when the time-out occurs by a time corresponding to a first retransmission period minus two round trip times (RTTs) plus a predetermined constant time.

* * * * *